United States Patent
Alexandroni et al.

(10) Patent No.: US 12,441,456 B2
(45) Date of Patent: Oct. 14, 2025

(54) WING MODULE FOR AIR VEHICLE WITH NON-ZERO ANGULAR DISPLACEMENT PIVOT AXES FOR FIRST WING AND SECOND WING ELEMENTS

(71) Applicant: ISRAEL AEROSPACE INDUSTRIES LTD., Lod (IL)

(72) Inventors: Shai Alexandroni, Lod (IL); Gaby Vaisman, Lod (IL); Ofek Ohana, Lod (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 233 days.

(21) Appl. No.: 18/000,976

(22) PCT Filed: Jun. 21, 2021

(86) PCT No.: PCT/IL2021/050753
§ 371 (c)(1),
(2) Date: Dec. 7, 2022

(87) PCT Pub. No.: WO2021/260688
PCT Pub. Date: Dec. 30, 2021

(65) Prior Publication Data
US 2023/0174218 A1    Jun. 8, 2023

(30) Foreign Application Priority Data
Jun. 22, 2020  (IL) .......................................... 275576

(51) Int. Cl.
*B64C 5/12*    (2006.01)
*B64C 5/02*    (2006.01)
(Continued)

(52) U.S. Cl.
CPC .................. *B64C 5/12* (2013.01); *B64C 5/02* (2013.01); *B64U 10/25* (2023.01); *B64U 30/40* (2023.01)

(58) Field of Classification Search
CPC ... B64C 3/546; B64C 3/56; B64C 5/12; F42B 10/14
See application file for complete search history.

(56) References Cited

U.S. PATENT DOCUMENTS

| | | |
|---|---|---|
| 4,106,727 A | 8/1978 | Ortell |
| 4,730,793 A | 3/1988 | Thurber et al. |

(Continued)

FOREIGN PATENT DOCUMENTS

| | | |
|---|---|---|
| CN | 106741847 A | 5/2017 |
| CN | 106828878 A | 6/2017 |

(Continued)

OTHER PUBLICATIONS

International Search Reporting and Written Opinion mailed Sep. 5, 2021 received in PCT/IL2021/050753.

(Continued)

*Primary Examiner* — Arfan Y. Sinaki
(74) *Attorney, Agent, or Firm* — Ballard Spahr LLP

(57) ABSTRACT

A wing system is provided for an air vehicle, having a fuselage including a fuselage section and a fuselage longitudinal axis. The wing system has at least one wing deployment module, each including a set of wing elements, including at least a first wing element having a first longitudinal axis, and a second wing element having a second longitudinal axis. Each wing deployment module is configured for selectively transitioning between a stowed configuration and a deployed configuration. In the stowed configuration, the first wing element and the second wing element are in overlying relationship such that the first longitudinal axis (Continued)

and the second longitudinal axis are nominally parallel with one another. In the deployed configuration, the first wing element is oriented with respect to the second wing element such that the first longitudinal axis is non-parallel with respect to the second longitudinal axis.

29 Claims, 17 Drawing Sheets

(51) Int. Cl.
 *B64U 10/25* (2023.01)
 *B64U 30/40* (2023.01)

(56) References Cited

U.S. PATENT DOCUMENTS

| | | | | |
|---|---|---|---|---|
| 5,615,846 | A * | 4/1997 | Shmoldas | F42B 15/105 |
| | | | | 244/3.28 |
| 5,899,410 | A * | 5/1999 | Garrett | B64C 39/068 |
| | | | | 244/45 R |
| 9,108,713 | B2 | 8/2015 | Tao et al. | |
| 11,180,252 | B2 * | 11/2021 | Varigas | B64C 3/38 |
| 2004/0217230 | A1 * | 11/2004 | Fanucci | B64C 3/40 |
| | | | | 244/46 |
| 2005/0218260 | A1 | 10/2005 | Corder et al. | |
| 2006/0163423 | A1 | 7/2006 | Parine et al. | |
| 2010/0282917 | A1 | 11/2010 | Oshea | |
| 2017/0291685 | A1 | 10/2017 | Alley et al. | |
| 2017/0336184 | A1 * | 11/2017 | Merems | B64U 30/12 |
| 2020/0079492 | A1 | 3/2020 | Noskowicz | |
| 2020/0149848 | A1 * | 5/2020 | O'Shea | F42B 10/18 |

FOREIGN PATENT DOCUMENTS

| | | |
|---|---|---|
| CN | 107380402 B | 10/2020 |
| RU | 2334651 C1 | 9/2008 |

OTHER PUBLICATIONS

Gao, Liang, et al., "Aerodynamic Characteristics of a Novel Catapult Launched Morphing Tandem-Wing Unmanned Aerial Vehicle", Advances in Mechanical Engineering, 2017, vol. 9(2) 1-15.

Rosid, Nurhayyan H., et al., "Aerodynamic Characteristics of Tube-Launched Tandem Wing Unmanned Aerial Vehicle", 5th International Seminar of Aerospace Science and Technology, IOP Conf. Series: Journal of Physics: Conf. Series 1005 (2018) 012015.

* cited by examiner

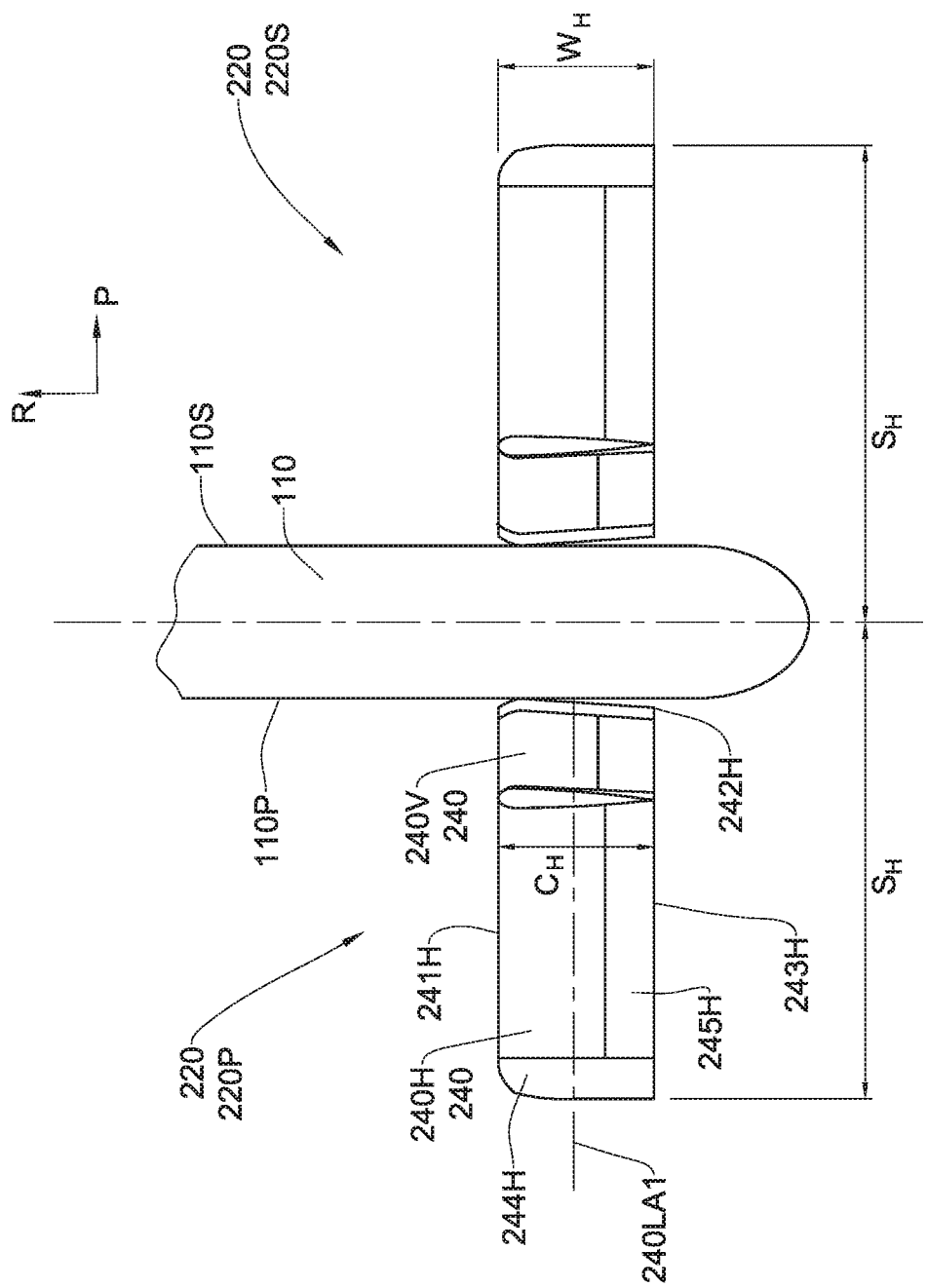

SECTION A-A

WING MODULE FOR AIR VEHICLE WITH NON-ZERO ANGULAR DISPLACEMENT PIVOT AXES FOR FIRST WING AND SECOND WING ELEMENTS

TECHNOLOGICAL FIELD

This invention relates to wing systems for an air vehicle, in particular to wing systems having deployable wing elements.

BACKGROUND

Some types of air vehicles, for example some types of unmanned air vehicles (UAVs), are configured as subsonic air vehicles. In some cases, the air vehicle is launched with the lift-generating wings folded in close proximity to the fuselage, and the wings are subsequently deployed to enable aerodynamic flight. In at least some such examples, the air vehicle also has a deployable empennage.

Some examples of existing air vehicles having a deployable appendage include: Lockheed Martin Outrider; Area-I ALTIUS family; Green Dragon (IAI); UVision Hero 120; SkyStriker; VXAerospace Dash X; AeroVironment Switchblade; MBDA Viper Strike.

By way of non-limiting example, on-line publication Nurhayyan H. Rosid et al 2018 J. Phys.: Conf. Ser. 1005 012015 discloses a tube Launched UAV with expandable tandem-wing configuration. Folding wing mechanism is used due to the requirements that the UAV should be folded into tubular launcher. This paper focuses on investigating the aerodynamics characteristics because of the effects of folding, wing mechanism, tandem wing configuration, and rapid deploying process from tube launcher.

Also by way of non-limiting example, U.S. Pat. No. 9,108,713 discloses a system comprising an aerial vehicle or an unmanned aerial vehicle (UAV) configured to control pitch, roll, and/or yaw via airfoils having resiliently mounted trailing edges opposed by fuselage-house deflecting actuator horns. Embodiments include one or more rudder elements which may be rotatably attached and actuated by an effector member disposed within the fuselage housing and extendible in part to engage the one or more rudder elements.

Also by way of non-limiting example, on-line publication "https://journals.sagepub.com/doi/pdf/10.1177/1687814017692290" discloses a morphing unmanned aerial vehicle with tandem-wing configuration that could fold into a tubular catapult and deploy the four airfoils after launching. Because of the rapid deploying process, the aerodynamic characteristics will become largely different.

Also by way of non-limiting example, CN107380402 discloses an unmanned aerial vehicle with folding wings. The unmanned aerial vehicle with the folding wings comprises a fuselage, the wings, horizontal tails, vertical tails, a folding wing releasing mechanism and a fixing base, and positioning holes are formed in the wings, the horizontal tails and the vertical tails; and positioning clamp columns are arranged on the fixing base, and the positioning clamp columns are matched with the positioning holes.

Also by way of non-limiting example, CN106741847 discloses a launching type unmanned aerial vehicle (UAV) and a system and an implementing method thereof, and relates to the technical field of launched UAVs. The launched UAV is characterized in that the flying states are different in a launching stage and an autonomous flying stage; the flying speed of the UAV can be decreased through an own power and/or resistance structure so as to enter a flying state of an inverse launching stage from the flying state of the launching stage; after passing through the inverse launching stage, the UAV enters the autonomous flying stage and can enter the flying state that the UAV flies by own power while arriving at or being close to a target place. According to the launching type UAV, the shape and/or the power is different in different stage, so that the convenience of storing, transporting and launching is ensured, and the convenience of scouting and locating can also be ensured; and the flying, scouting and fighting capacities of the UAV under a complex environment can be improved to a certain extent.

Also by way of non-limiting example, US 2006/163423 discloses a missile having fins that rotate about a single axis to deploy from a stowed position to a deployed position. A foil longitudinal axis of each fin is angled relative to a shaft of the fin, such that a single-axis rotation of the shaft moves the foil from the stowed position to a deployed position. A coil spring may provide both torsion and compression forces to rotate the fin into the deployed position and lock it into place. Torsion rotates the shaft until it reaches a seat on a bushing that is around the shaft. Then compression forces from the spring engage a keyed protrusion on the shaft with a corresponding keyway in the bushing, locking the shaft in place. There may be an additional lock once the fin is deployed, such as a spring-loaded pin in the missile body that engages a depression in the shaft.

General Description

According to a first aspect of the presently disclosed subject matter, there is provided a wing system for an air vehicle, the air vehicle having a fuselage including a fuselage section and a fuselage longitudinal axis, the wing system comprising at least one wing deployment module, each wing deployment module comprising:
 a set of wing elements, including at least a first said wing element having a first wing element longitudinal axis, and a second said wing element having a second wing element longitudinal axis;
 each said wing deployment module configured for selectively transitioning between a respective stowed configuration and a respective deployed configuration;
 wherein in the stowed configuration, the first wing element and the second wing element are in overlying relationship such that the first wing element longitudinal axis and the second wing element longitudinal axis are nominally parallel with one another; and
 wherein in the deployed configuration, the first wing element is oriented with respect to the second wing element such that the first wing element longitudinal axis is non-parallel with respect to the second wing element longitudinal axis.

For example, in the stowed configuration, the first wing element and the second wing element are configured in said overlying relationship for being oriented with respect to the fuselage section such that the first wing element longitudinal axis and the second wing element longitudinal axis are each nominally parallel with the fuselage longitudinal axis.

Additionally or alternatively, for example, in the deployed configuration, the first wing element is oriented with respect to the fuselage section such that the first wing element longitudinal axis is non-parallel with respect to the fuselage longitudinal axis.

Additionally or alternatively, for example, in the deployed configuration, the first wing element is oriented with respect to the fuselage section such that the first wing element longitudinal axis is orthogonal with respect to the fuselage longitudinal axis.

Additionally or alternatively, for example, in the deployed configuration, the second wing element is oriented with respect to the fuselage section such that the second wing element longitudinal axis is non-parallel with respect to the fuselage longitudinal axis.

Additionally or alternatively, for example, in the deployed configuration, the second wing element is oriented with respect to the fuselage section such that the second wing element longitudinal axis is orthogonal with respect to the fuselage longitudinal axis.

Additionally or alternatively, for example, in the deployed configuration, the first wing element longitudinal axis is nominally parallel with the pitch axis of the air vehicle.

Additionally or alternatively, for example, each wing deployment module is configured for having the first wing element relatively outboard, and the second wing element relatively inboard, with respect to the fuselage section.

Additionally or alternatively, for example, each wing deployment module in the stowed configuration comprises a first wing root of the first wing element in overlying relationship with respect to a second wing root of the second wing element.

Additionally or alternatively, for example, each wing deployment module comprises a first wing tip and a first root of the first wing element, and a second wing tip and a second wing root of the second wing element, and wherein each wing deployment module is configured such that in the stowed configuration the first wing tip is forward of the first wing root, and/or the second wing tip is forward of the second wing root, with respect to the air vehicle.

Additionally or alternatively, for example, each wing deployment module in the stowed configuration is configured for providing the first wing element and the second wing element in overlying relationship with respect to the fuselage section.

Additionally or alternatively, for example, for each wing deployment module: each said first wing element is configured for being transitioned between the stowed configuration and the deployed configuration by:
  pivoting said first wing element about a first module pivot axis by a non-zero first module angular displacement, and
  pivoting said first wing element about a first wing element pivot axis by a non-zero first wing element angular displacement; each said second wing element is configured for being transitioned between the stowed configuration and the deployed configuration by:
  pivoting said second wing element about a second module pivot axis by a non-zero second module angular displacement.

In at least some examples, for each wing deployment module, each said second wing element is further configured for being transitioned between the stowed configuration and the deployed configuration by:
  pivoting said second wing element about a second wing element pivot axis by a non-zero second wing element angular displacement.

Additionally or alternatively, for example, at least one of said first module pivot axis and said second module pivot axis is parallel to a pitch axis of the air vehicle.

Additionally or alternatively, for example, said first wing element pivot axis and said second wing element pivot axis are parallel to one another.

Additionally or alternatively, for example, said first module pivot axis and said second module pivot axis are co-axial.

Additionally or alternatively, for example, at least one of said first wing element pivot axis and said second wing element pivot axis is parallel to a roll axis of the air vehicle.

Additionally or alternatively, for example, said first module angular displacement is between 80° and 100°.

Additionally or alternatively, for example, said first module angular displacement is about 90°.

Additionally or alternatively, for example, said first module angular displacement is such as to enable the first wing element to adopt an non-zero incidence angle in the deployed configuration.

Additionally or alternatively, for example, said second module angular displacement is between 80° and 100°.

Additionally or alternatively, for example, said second module angular displacement is about 90°.

Additionally or alternatively, for example, said first module angular displacement and said second module angular displacement are equal to one another.

Additionally or alternatively, for example, said wing deployment module is configured for pivoting as a unit about at least one of said first module pivot axis and said second module pivot axis.

Additionally or alternatively, for example, said first wing element angular displacement is between 70° and 110°.

Additionally or alternatively, for example, said first wing element angular displacement is about 90°.

Additionally or alternatively, for example, said second wing element angular displacement is between −20° and +20°.

Additionally or alternatively, for example, in some examples said second wing element angular displacement is about 15°, while in other examples, said second wing element angular displacement is about 0°.

Additionally or alternatively, for example, the wing system in at least a first example is configured for deploying the wing deployment module from the stowed configuration to the deployed configuration by:
  (a) concurrently pivoting the first wing element about the first module pivot axis by said non-zero first module angular displacement and the second wing element about the second module pivot axis by said non-zero second module angular displacement;
  (b) subsequent to step (a), pivoting said first wing element about the first wing element pivot axis by said non-zero first wing element angular displacement.

For example, the wing system is further configured for deploying the wing deployment module from the stowed configuration to the deployed configuration by:
  (c) subsequent to step (a), pivoting said second wing element about the second wing element pivot axis by said non-zero second wing element angular displacement.

Alternatively, for example, the wing system in at least one second example is configured for deploying the wing deployment module from the stowed configuration to the deployed configuration by:
  (a) concurrently pivoting the first wing element about the first module pivot axis to a first partial first module angular displacement, and the second wing element about the second module pivot axis to a first partial second module angular displacement;
  (b) subsequent to step (a), pivoting said first wing element about the first wing element pivot axis by said non-zero first wing element angular displacement, while concurrently pivoting the first wing element about the first module pivot axis to a second partial first module angular displacement, and the second wing element about the second module pivot axis to a second partial second module angular displacement;
(c) subsequent to step (b), concurrently pivoting the first wing element about the first module pivot axis to said first module angular displacement, and the second wing element about the second module pivot axis to said second module angular displacement;
wherein said second partial first module angular displacement is less than said non-zero first module angular displacement and greater than said first partial first module angular displacement, and
wherein said second partial second module angular displacement is less than said non-zero second module angular displacement and greater than said first partial second module angular displacement.

In alternative variations of this example, said second partial first module angular displacement is equal to said non-zero first module angular displacement, and/or, said second partial second module angular displacement is equal to said non-zero second module angular displacement.

Alternatively, for example, the wing system in at least one third example is configured for deploying the wing deployment module from the stowed configuration to the deployed configuration by:
(a1) pivoting the first wing element about the first module pivot axis to a first partial first module angular displacement;
(b1) subsequent to step (a1), pivoting said first wing element about the first wing element pivot axis by said non-zero first wing element angular displacement, and pivoting the first wing element about the first module pivot axis to a second partial first module angular displacement;
(c1) subsequent to step (b2), respectively pivoting the first wing element about the first module pivot axis to said first module angular displacement;
wherein said second partial first module angular displacement is less than said non-zero first module angular displacement and greater than said first partial first module angular displacement.

Alternatively, for example, the wing system in at least one fourth example is configured for deploying the wing deployment module from the stowed configuration to the deployed configuration by:
(a2) pivoting the second wing element about the second module pivot axis to a first partial second module angular displacement;
(b2) subsequent to step (a2), pivoting the second wing element about the second module pivot axis to a second partial second module angular displacement;
(c2) subsequent to step (b2), pivoting the second wing element about the second module pivot axis to said second module angular displacement;
wherein said second partial second module angular displacement is less than said non-zero second module angular displacement and greater than said first partial second module angular displacement.

For example, step (a1) can be concurrent with step (a2). Additionally or alternatively, for example, step (b1) can be concurrent with step (b2). Additionally or alternatively, for example, step (c1) can be concurrent with step (c2).

For example, the wing system according to the second, third or fourth example is further configured for deploying the wing deployment module from the stowed configuration to the deployed configuration by further including in step (b), step (b1) or step (b2), respectively:
(d) pivoting said second wing element about the second wing element pivot axis by said non-zero second wing element angular displacement.

Additionally or alternatively, for example, each said wing deployment module is configured for being mounted to a lateral side of the fuselage section.

Additionally or alternatively, for example, each said wing deployment module is configured with a respective maximum width in the stowed configuration correlated with a fuselage height of the fuselage section.

Additionally or alternatively, for example, the wing system comprises two said wing deployment modules, including a first said wing deployment module configured for being mounted to the air vehicle at a port side of the fuselage section, and a second said wing deployment module configured for being mounted to the air vehicle at a starboard side of the fuselage section.

Additionally or alternatively, for example, the wing system is configured as an empennage for the air vehicle. For example, for each said wing deployment module, the first wing element is configured as a horizontal stabilizer, and the second wing element is configured as a vertical stabilizer. For example, for each said wing deployment module, the first wing element comprises an actuable elevator, and the second wing element comprises an actuable rudder. Alternatively, for each said wing deployment module, the first wing element is configured as an actuable monoblock elevator, and the second wing element is configured as an actuable monoblock rudder.

Additionally or alternatively, for example, said fuselage section is an aft fuselage section of the air vehicle.

According to the first aspect of the presently disclosed subject matter, there is also provided a wing system configured as an empennage for an air vehicle, the air vehicle having a fuselage including a fuselage section and a fuselage longitudinal axis, the wing system comprising at least one wing deployment module, each wing deployment module comprising:
a set of wing elements, including at least a first said wing element configured as a horizontal stabilizer and having a first wing element longitudinal axis, and a second said wing element configured as a vertical stabilizer having a second wing element longitudinal axis;
each said wing deployment module configured for selectively transitioning between a respective stowed configuration and a respective deployed configuration;
wherein in the stowed configuration, the first wing element and the second wing element are in overlying relationship such that the first wing element longitudinal axis and the second wing element longitudinal axis are nominally parallel with one another;
wherein in the deployed configuration, the first wing element is oriented with respect to the second wing element such that the first wing element longitudinal axis is non-parallel with respect to the second wing element longitudinal axis;
wherein each said first wing element is configured for being transitioned between the stowed configuration and the deployed configuration by:
pivoting said first wing element about a module pivot axis by a non-zero module angular displacement, and
pivoting said first wing element about a first wing element pivot axis by a non-zero first wing element angular displacement; and wherein each said second wing element is configured for being transitioned between the stowed configuration and the deployed configuration by at least:

pivoting said second wing element about said module pivot axis by said non-zero module angular displacement.

For example, in the deployed configuration, the first wing element is oriented with respect to the second wing element such that the first wing element can operate as a horizontal stabilizer, and such that the second wing element can operate as a vertical stabilizer.

In at least some examples, for each wing deployment module, each said second wing element is further configured for being transitioned between the stowed configuration and the deployed configuration by:

pivoting said second wing element about a second wing element pivot axis by a non-zero second wing element angular displacement.

For example, for each said wing deployment module, the first wing element comprises an actuable elevator, and the second wing element comprises an actuable rudder. Alternatively, for each said wing deployment module, the first wing element is configured as an actuable monoblock elevator, and the second wing element is configured as an actuable monoblock rudder.

Additionally or alternatively, for example, said fuselage section is an aft fuselage section of the air vehicle.

Additionally or alternatively, for example, said module angular displacement is between 80° and 100°.

Additionally or alternatively, for example, said module angular displacement is about 90°.

Additionally or alternatively, for example, said module angular displacement is such as to enable the first wing element to adopt an non-zero incidence angle in the deployed configuration.

Additionally or alternatively, for example, said wing deployment module is configured for pivoting as a unit about at least one of said first module pivot axis and said second module pivot axis.

Additionally or alternatively, for example, said first wing element angular displacement is between 70° and 110°.

Additionally or alternatively, for example, said first wing element angular displacement is about 90°.

Additionally or alternatively, for example, said second wing element angular displacement is between −20° and +20°.

Additionally or alternatively, for example, in some examples said second wing element angular displacement is about 15°, while in other examples, said second wing element angular displacement is about 0°.

Additionally or alternatively, for example, each said wing deployment module is configured for being mounted to a lateral side of the fuselage section.

According to a second aspect of the presently disclosed subject matter, there is provided an air vehicle comprising a wing system as defined herein regarding the first aspect of the presently disclosed subject matter.

For example, the air vehicle further comprises a deployable wing arrangement, including at least one aerodynamic lift generating wing, deployable from a stowed wing configuration to a deployed wing configuration, wherein said at least one aerodynamic lift generating wing is configured for generating sufficient aerodynamic lift for aerodynamic flight for the air vehicle, the deployable wing arrangement being mounted in one of above and below with respect to the fuselage section. For example, the deployable wing arrangement is mounted below with respect to the fuselage section, and wherein in the stowed configuration the first wing element and the second wing element of each wing deployment module are configured such as to avoid projecting in a downwardly direction past the wing arrangement.

Additionally or alternatively, for example, the air vehicle is configured for being accommodated in a fairing when the wing system is in the stowed configuration.

According to a second aspect of the presently disclosed subject matter, there is provided a method for providing stability and control for an air vehicle, comprising:

providing an air vehicle as defined herein regarding the second aspect of the presently disclosed subject matter;

deploying each said wing deployment module from the stowed configuration to the deployed configuration;

actuating the first wing element and the second wing element of each wing deployment module to provide control moments to the air vehicle.

According to a third aspect of the presently disclosed subject matter, there is provided a method for operating a wing system for an air vehicle, comprising:

(A) providing an air vehicle as defined herein regarding the second aspect of the presently disclosed subject matter;

(B) deploying each said wing deployment module from the stowed configuration to the deployed configuration.

For example, step (B) comprises:

pivoting said first wing element about a first module pivot axis by a non-zero first module angular displacement, pivoting said first wing element about a first wing element pivot axis by a non-zero first wing element angular displacement;

pivoting said second wing element about a second module pivot axis by a non-zero second module angular displacement.

Optionally, step (B) also comprises:

pivoting said second wing element about a second wing element pivot axis by a non-zero second wing element angular displacement.

In at least a first example, step (B) comprises:

(a) concurrently pivoting the first wing element about the first module pivot axis by said non-zero first module angular displacement and the second wing element about the second module pivot axis by said non-zero second module angular displacement;

(b) subsequent to step (a), pivoting said first wing element about the first wing element pivot axis by said non-zero first wing element angular displacement.

Optionally, the method of the first example further comprises:

(c) subsequent to step (a), pivoting said second wing element about the second wing element pivot axis by said non-zero second wing element angular displacement.

In at least a second example, step (B) comprises:

(a) concurrently pivoting the first wing element about the first module pivot axis to a first partial first module angular displacement, and the second wing element about the second module pivot axis to a first partial second module angular displacement;

(b) subsequent to step (a), pivoting said first wing element about the first wing element pivot axis by said non-zero first wing element angular displacement, while concurrently pivoting the first wing element about the first module pivot axis to a second partial first module angular displacement, and the second wing element about the second module pivot axis to a second partial second module angular displacement;

(c) subsequent to step (b), concurrently pivoting the first wing element about the first module pivot axis to said first module angular displacement, and the second wing element about the second module pivot axis to said second module angular displacement;

wherein said second partial first module angular displacement is less than said non-zero first module angular displacement and greater than said first partial first module angular displacement, and wherein said second partial second module angular displacement is less than said non-zero second module angular displacement and greater than said first partial second module angular displacement.

In alternative variations of this example, said second partial first module angular displacement is equal to said non-zero first module angular displacement, and/or, said second partial second module angular displacement is equal to said non-zero second module angular displacement.

In at least a third example, step (B) comprises:
(a1) pivoting the first wing element about the first module pivot axis to a first partial first module angular displacement;
(b1) subsequent to step (a1), pivoting said first wing element about the first wing element pivot axis by said non-zero first wing element angular displacement, and pivoting the first wing element about the first module pivot axis to a second partial first module angular displacement;
(c1) subsequent to step (b2), respectively pivoting the first wing element about the first module pivot axis to said first module angular displacement;
wherein said second partial first module angular displacement is less than said non-zero first module angular displacement and greater than said first partial first module angular displacement.

In at least a fourth example, step (B) comprises:
(a2) pivoting the second wing element about the second module pivot axis to a first partial second module angular displacement;
(b2) subsequent to step (a2), pivoting the second wing element about the second module pivot axis to a second partial second module angular displacement;
(c2) subsequent to step (b2), pivoting the second wing element about the second module pivot axis to said second module angular displacement;
wherein said second partial second module angular displacement is less than said non-zero second module angular displacement and greater than said first partial second module angular displacement.

For example, step (a1) can be concurrent with step (a2). Additionally or alternatively, for example, step (b1) can be concurrent with step (b2). Additionally or alternatively, for example, step (c1) can be concurrent with step (c2).

Optionally, the method according to the second example, the third example or the fourth example further includes in step (b), step (b1), or step (b2), respectively:
(d) pivoting said second wing element about the second wing element pivot axis by said non-zero second wing element angular displacement.

A feature of at least one example of the presently disclosed subject matter is that a wing system is provided for an air vehicle, in which in said stowed configuration, the respective first wing element and second wing element of each wing deployment module is compactly folded onto the fuselage lateral sides without projecting past the vertical location of the wing arrangement, thereby enabling maximizing occupancy of the cross-sectional area of the fairing in which it is desired to accommodate the air vehicle in stowed configuration.

Another feature of at least one example of the presently disclosed subject matter is that a wing system is provided for an air vehicle, in which in the deployed configuration the wing system in the form of an empennage can provide for stability and steering even prior to deployment of the main lift generating wing arrangement of the air vehicle.

Another feature of at least one example of the presently disclosed subject matter is that a wing system is provided for an air vehicle, in which a high degree of flexibility can be applied to the design of each wing deployment module, chord size and distribution, taper, span and width, wherein to enable for efficient lateral packaging with respect to the fuselage, within an envelope provided by a fairing.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 2(b) is a top view of the example of FIG. 2.

DETAILED DESCRIPTION

Referring to FIGS. 1, 2, 2(a), 2(b), an air vehicle according to a first example of the presently disclosed subject matter, generally designated 100, comprises a wing system 200, which is per se novel. The wing system 200 comprises at least one wing deployment module 220, also referred to herein interchangeably as a wing module.

Figure 1:
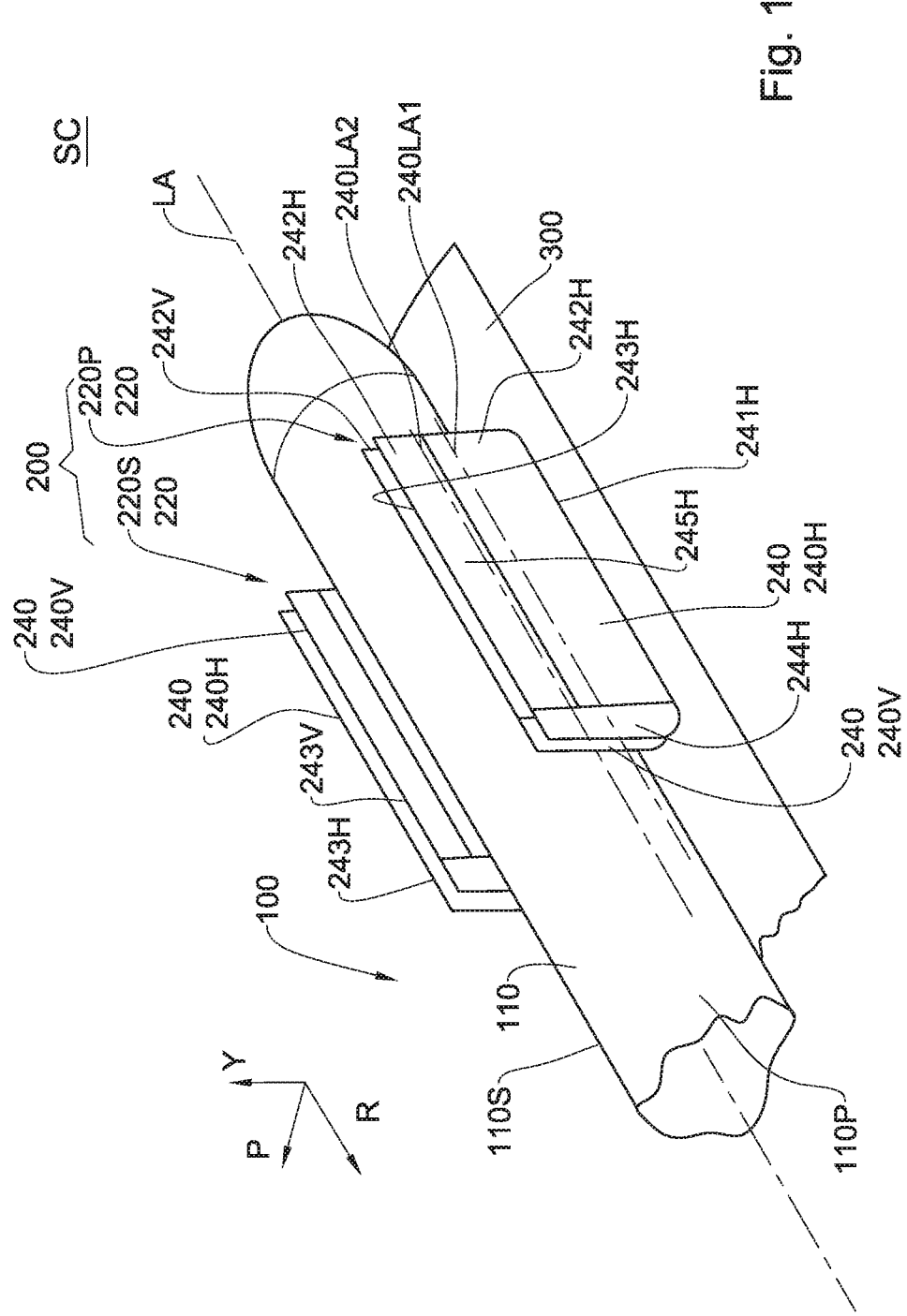
FIG. 1 shows in isometric partial view, an air vehicle comprising a wing system according to a first example of the presently disclosed subject matter, wherein the wing system is in the stowed configuration.

In at least this example, and referring in particular to FIG. 1, the air vehicle 100 is a powered, fixed-wing type air vehicle, comprising a subsonic or a transonic configuration, comprising a fuselage having a fuselage section, which in this example is an aft fuselage section 110, a wing arrangement 300 for providing aerodynamic lift to the air vehicle 100, a suitable propulsion system (not shown), and said wing system 200. In alternative variations of this example, the air vehicle 100 can be instead configured with a supersonic configuration.

The fuselage, in particular the fuselage section, which in this example is an aft fuselage section 110, has a fuselage longitudinal axis LA.

While the wing system 200 is described in examples below with respect to the aft fuselage section 110, in alternative variations of such examples, the same teaching can be applied, mutatis mutandis, to other fuselage sections of the fuselage, as appropriate.

The wing arrangement 300 can include, at least in this example, a foldable or otherwise deployable wing arrangement, including one, two or more aerodynamic lift generating wings, which are deployable from a stowed wing configuration to a deployed wing configuration. In the stowed wing configuration, the one or more aerodynamic lift generating wings are accommodated above and/or below the fuselage, with the respective span axes generally aligned with the aft fuselage section 110. In the deployed wing configuration, the one or more aerodynamic lift generating wings are projecting outwardly with respect to the aft fuselage section such that the leading edge of the wings are now facing an airstream AS, and enable the wings to generate aerodynamic lift. Such an airstream relative to the wings can be a result of the air vehicle 100 travelling at a significant forward speed in air, for example. The one or more aerodynamic lift generating wing are configured for generating sufficient aerodynamic lift for aerodynamic flight for the air vehicle.

In at least this example, and in other examples, the wing system 200 is configured as a tail configuration or an empennage for the air vehicle 100. However, in alternative variations of this example, and in other examples, the corresponding wing system can be configured for example as lift-generating wings of the air vehicle, or as other wings for the vehicle.

Furthermore, while the presently disclosed subject matter finds particular application in UAV aircraft, the presently disclosed subject matter can also be applied to manned aircraft, mutatis mutandis, in particular to general aviation, subsonic transport, naval aviation, and so on, for example. In alternative variations of this example, and in other examples, the air vehicle 100 can instead be configured as an unpowered, fixed-wing type subsonic or transonic air vehicle, manned or unmanned.

The air vehicle 100 further comprises a control system comprising a controller (not shown) configured for operating the air vehicle 100, and in particular configured for operating the wing system 200, at least within the flight envelope thereof.

As will become clearer herein, the wing system 200 has a stowed configuration SC, and a deployed configuration DC. Furthermore, the wing system 200 is configured for selectively transitioning between stowed configuration SC, and the deployed configuration DC.

In this example, the wing system 200 comprises two wing deployment modules 220, in particular a port wing deployment module 220P and a starboard wing deployment module 220S. Thus, unless otherwise specified herein, the reference numeral 220 shall also refer to each one of the port wing deployment module 220P and the starboard wing deployment module 220S. However, in other alternative variations of this example, the wing system 200 comprises a single wing deployment module 220—for example in the form of a V-tail. In yet other alternative variations of this example, the wing system 200 can comprise more than two wing deployment modules 220—for example three or four sets of V-fins arranged around the periphery of the fuselage section.

Each wing deployment module 220 is configured for being mounted to a lateral side of the fuselage section, in particular of the aft fuselage section 110.

In at least this example, the port wing deployment module 220P is mounted to a port side 110P of the aft fuselage section 110, and the starboard wing deployment module 220S is mounted to a starboard side 110S of the aft fuselage section 110.

The port wing deployment module 220P and the starboard wing deployment module 220S are essentially mirror images of one another, and are otherwise substantially identical with one another.

Each wing module 220 comprises a set of wing elements 240 including at least one first wing element 240H, and at least one second wing element 240V. In at least this example, each wing module 220 comprises a set of wing elements 240 including a single first wing element 240H and a single second wing element 240V.

In alternative variations of this example, each wing module 220 can comprise a set of wing elements 240 including more than one first wing element 240H and/or more than one second wing element 240V. For example, in such examples in which the wing module includes two second wing elements, these can be in mutually overlying relationship in the stowed configuration (and also overlying with respect to one or more first wing elements in the stowed configuration), and are deployed in the deployed configuration such that one second wing element is projecting upwardly from the aft fuselage section (as in the illustrated examples), and the other second wing element is projecting in the opposite direction—downwardly from the aft fuselage section. Additionally or alternatively, for example, in such examples in which the wing module includes two first wing elements, these can be in mutually overlying relationship in the stowed configuration (and also overlying with respect to one or more first wing elements in the stowed configuration), and are deployed in the deployed configuration such that one first wing element is inclined upwardly from the aft fuselage section, and the other first wing element is inclined downwardly from the aft fuselage section, for example in "<" formation.

In at least this example, for each wing module 220, the respective first wing element 240H is configured as a horizontal stabilizer, also referred to interchangeably herein as a horizontal tail, and the second wing element 240V is configured as vertical stabilizer, also referred to interchangeably herein as a vertical tail.

The first wing element 240H in at least this example has a corresponding aerofoil cross-sectional profile $AE_H$ with chord $C_H$ at transverse sections along the first wing element longitudinal axis 240LA1 thereof, from the first wing element root 242H to the first wing element tip 244H. While in this example the aerofoil cross-sectional profiles $AE_H$ have zero camber and generate zero aerodynamic force (i.e., have a lift coefficient of zero) corresponding to a zero angle of attack $\alpha$ to an airstream, in alternative variations of this example the aerofoil cross-sectional profiles $AE_H$ can have non-zero camber and/or generate an aerodynamic force (i.e., have a non-zero, positive lift coefficient) corresponding to a zero angle of attack $\alpha$ to an airstream.

In at least this example the first wing element 240H has a leading edge 241H, a trailing edge 243H, and a span $S_H$. The first wing element first wing element longitudinal axis 240LA1 extends along the length of the first wing element 240H between the first wing element root 242H and the first wing element tip 244H.

In at least this example the first wing element 240H is in plan form generally rectangular, and the aerofoil cross-sectional profile $AE_H$ is uniform in size and profile along the respective first wing element first wing element longitudinal axis 240LA1 of the first wing element 240H. Thus the first wing element 240H in at least this example the chord $C_H$ is uniform (and corresponds to the maximum chord of the first wing element 240H).

However, in alternative variations of this example the first wing element 240H can be, for example, in plan form generally trapezoidal (i.e., having a taper) or any other shape, and the aerofoil cross-sectional profile $AE_H$ is uniform in profile along the respective first wing element first wing element longitudinal axis 240LA1 of the first wing element 240H, but the size of the aerofoil cross-sectional profile $AE_H$ at each span-wise position along the first wing element first wing element longitudinal axis 240LA1 of the respective first wing element 240H can change in proportion to the size of the chord $C_H$ at the respective span-wise position. In such a case, the chord $C_H$ can vary between a maximum chord, and a minimum chord.

However, in yet other alternative variations of this example the first wing element 240H can be, for example, in plan form generally trapezoidal (i.e., having a taper) or any other shape, and the aerofoil cross-sectional profile $AE_H$ is non-uniform in profile along the respective first wing element first wing element longitudinal axis 240LA1 of the first wing element 240H, and furthermore the size of the aerofoil cross-sectional profile $AE_H$ at each span-wise position along the first wing element first wing element longitudinal axis 240LA1 of the respective first wing element 240H can change in proportion to the size of the chord $C_H$ at the respective span-wise position. In such a case, the chord $C_H$ can vary between a maximum chord, and a minimum chord.

In at least this example the first wing element 240H is non-swept, and thus the span $S_H$ is parallel to the first wing element first wing element longitudinal axis 240LA1. However, in alternative variations of this example, the first wing element 240H can be swept, having for example a positive sweep angle or a negative sweep angle, and thus the span $S_H$ is non-parallel to the first wing element longitudinal axis 240LA1.

In at least one of the above examples the respective thickness to chord ratio along the respective first wing element first wing element longitudinal axis 240LA1 of the first wing element 240H can be uniform. Alternatively, in at least one variation of the above examples the respective thickness to chord ratio along the respective span of the first wing element 240H can be non-uniform. For example, respective thickness to chord ratio along the respective first wing element first wing element longitudinal axis 240LA1 can be reduced in a direction from the respective first wing element root 242H to the first wing element tip 244H.

It is to be noted that in plan view (for example as seen in FIG. 2(b)), the first wing element 240H is configured with a maximum width $W_H$, wherein this width is taken orthogonal to the span $S_H$, and/or to the first wing element first wing element longitudinal axis 240LA1 of the first wing element 240H. Such a maximum width $W_H$ is correlated to the height HF of the aft fuselage section 110. For example, such a maximum width $W_H$ is about the same dimension as the height HF of the aft fuselage section 110, or within ±10% or within ±20% of the height HF of the aft fuselage section 110.

In at least this example the first wing element 240H comprises at least one control surface, in the form of elevator 245H, which can be controllably operated by pivoting about a pivot axis to provide selectively positive elevator deflections or negative elevator deflections to thereby enable control moments in pitch, yaw and roll to be generated, as will become clearer herein. In alternative variations of this example, the first wing element 240H itself is configured as an actuable monoblock elevator, which can be controllably operated to pivot about a suitable first wing element pivot axis to provide selectively positive elevator deflections or elevator rudder deflections to thereby enable control moments in pitch, yaw and roll to be generated.

In at least this example, a suitable actuator system (not shown) is operatively coupled to the of elevator 245H as well as to the controller to control and carry out changes in elevator deflection angle. For example, such an actuator system can be embedded within the first wing element 240H itself, for example inside of the main body of the first wing element 240H. By way of non-limiting example, such an actuator system can include one or more of the Volz DA-30 or the Volz DA-15 servos, by Volz Servos GmbH & Co. KG, Germany.

Figure 2:
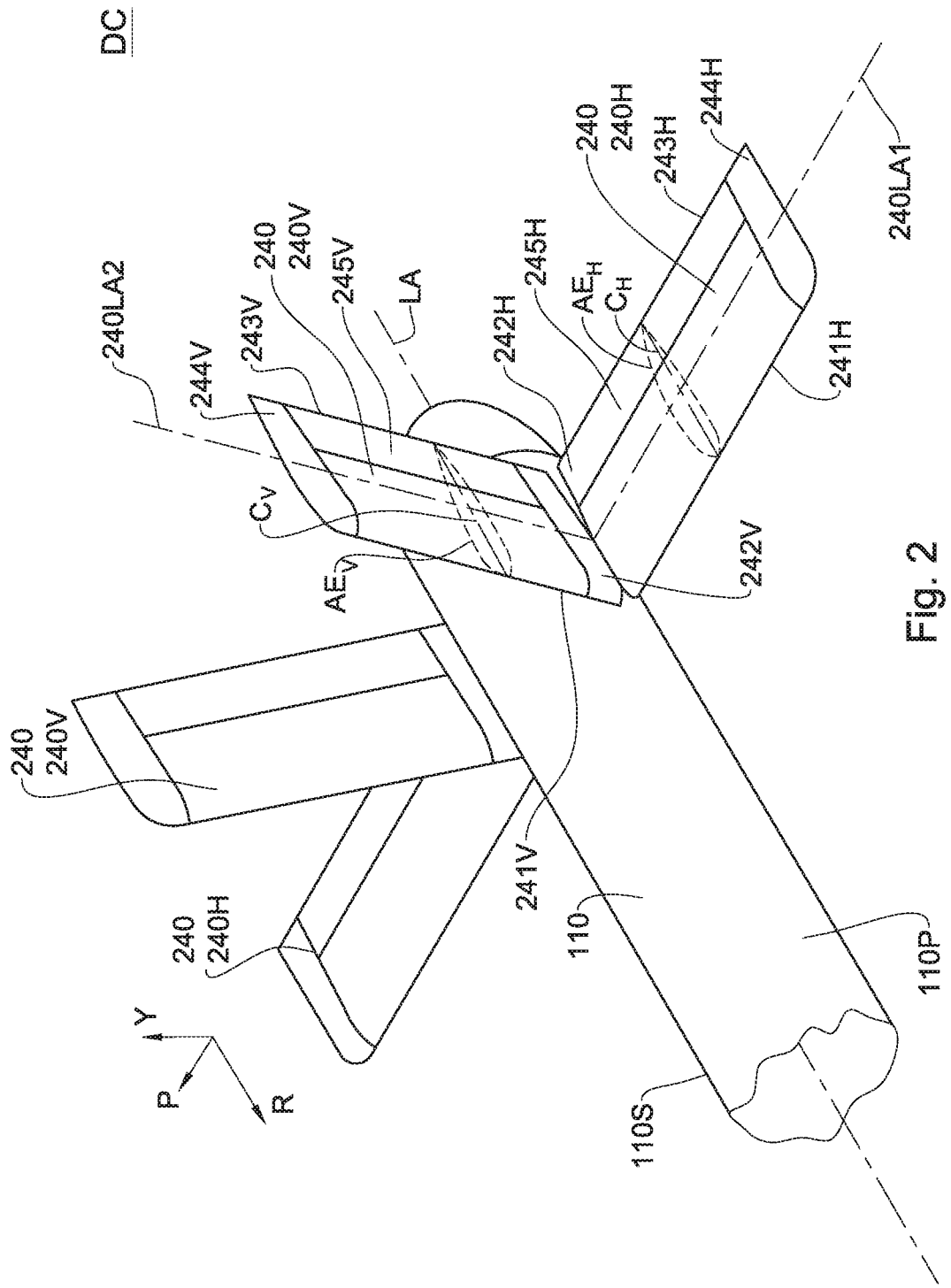
FIG. 2 shows in isometric partial view, the air vehicle and wing system of the example of FIG. 1, wherein the wing system is in the deployed configuration.
Figure 2A:
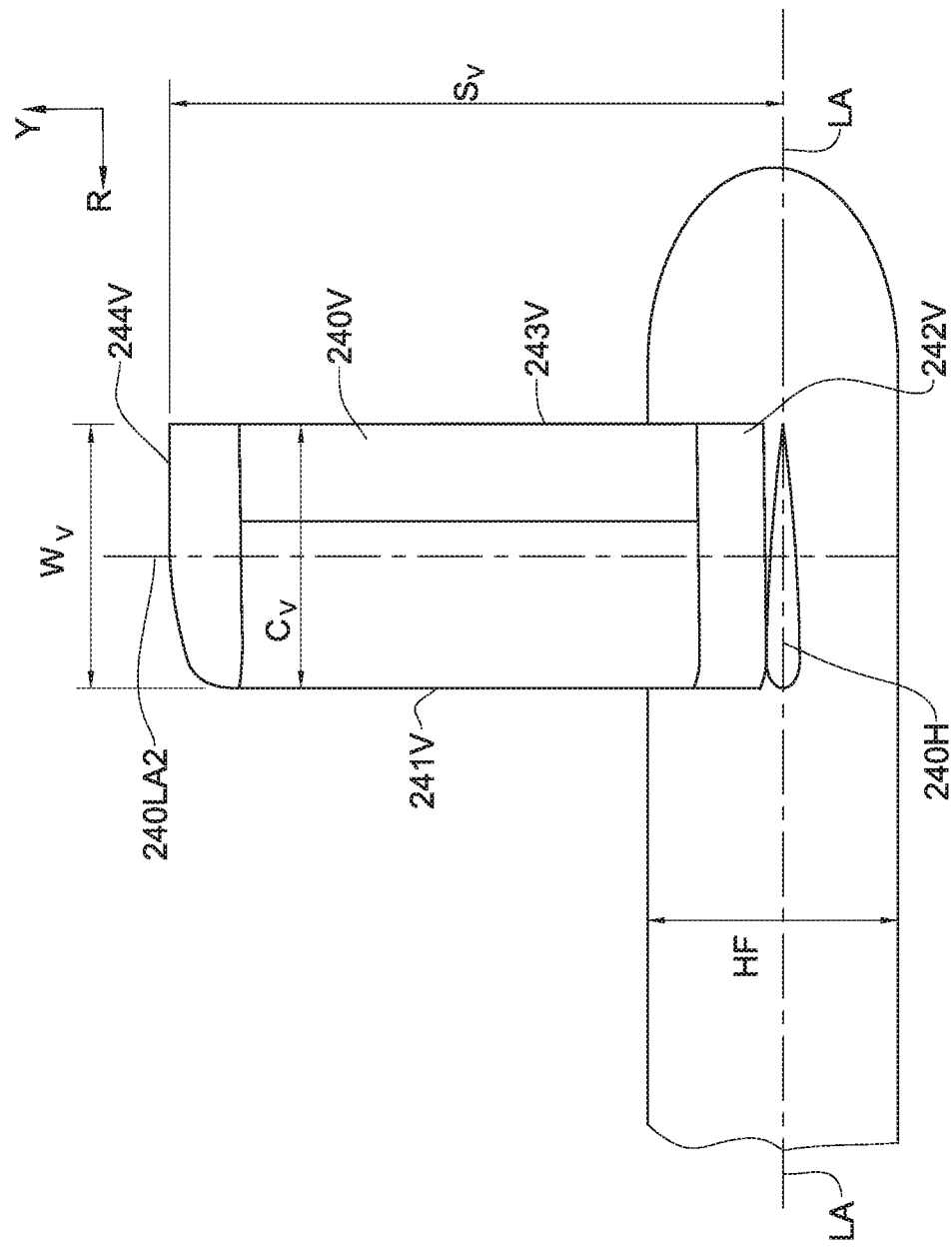
FIG. 2(a) is a side view of the example of FIG. 2.
Figure 2C:
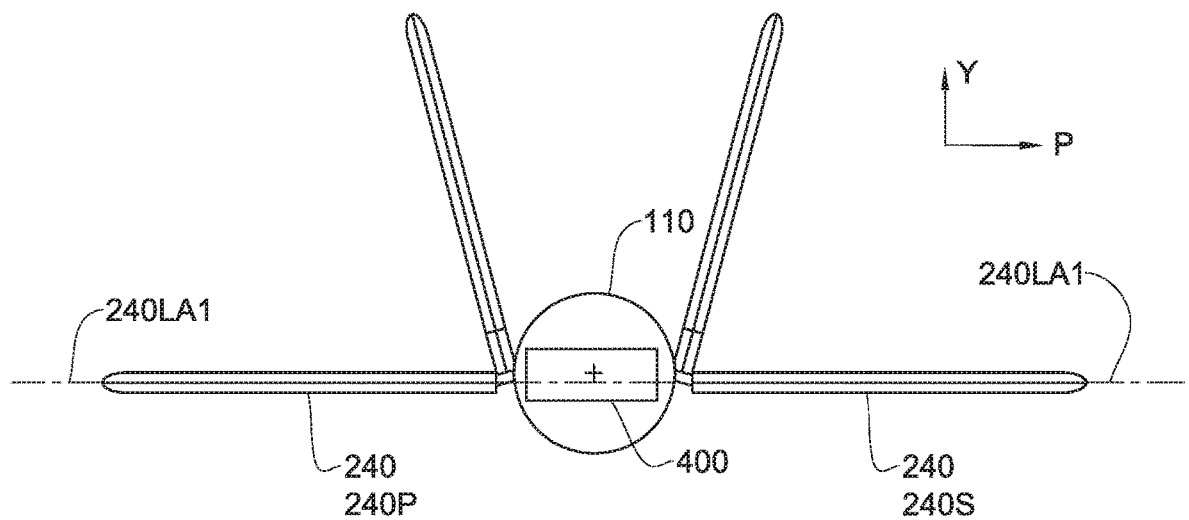
FIG. 2(c) is an aft view of the example of FIG. 2.

Referring to FIG. 2(c), in at least this example, in the deployed configuration DC, the first wing element 240H is oriented with respect to the aft fuselage section 110 at nominally zero dihedral angle, in other words, the respective first wing element longitudinal axes 240LA1 of the port and starboard first wing elements 240H are parallel to one another, in particular co-axial with one another. Thus, the pivot axis of the elevator 245H is essentially parallel to the pitch axis of the air vehicle 100. Furthermore, in the deployed configuration DC, the first wing element 240H is projecting outwardly and laterally from the aft fuselage section 110 such that the first wing element tip 244H is at a greater spacing from the aft fuselage section 110 than first wing element root 242H.

Referring again to FIG. 1, in the stowed configuration SC, the first wing element 240H and the second wing element 240V are in overlying relationship such that the first wing element longitudinal axis 240LA1 and the second wing element longitudinal axis 240LA2 are nominally parallel with one another. Each wing deployment module 220 in the stowed configuration SC is configured for providing the first wing element 240H and the second wing element 240V in overlying relationship with respect to the fuselage section 110.

As will become clearer herein, in the stowed configuration SC, the first wing element 240H and the second wing element 240V are configured in the aforesaid overlying relationship for being oriented with respect to the fuselage section 110 such that the first wing element longitudinal axis 240LA1 and the second wing element longitudinal axis 240LA2 are each nominally parallel with the fuselage longitudinal axis LA.

Referring again to FIG. 2, in the deployed configuration DC, the first wing element 240H is oriented with respect to the second wing element 240V such that the first wing element longitudinal axis 240LA1 is non-parallel with respect to the second wing element longitudinal axis 240LA2.

Also as will become clearer herein, in the deployed configuration DC, the first wing element 240H is oriented with respect to the fuselage section 110 such that the first wing element longitudinal axis 240LA1 is non-parallel, for example orthogonal, with respect to the fuselage longitudinal axis LA. Furthermore, in the deployed configuration DC, the second wing element 240V is oriented with respect to the fuselage section 110 such that the second wing element longitudinal axis 240LA2 is non-parallel, for example orthogonal, with respect to the fuselage longitudinal axis LA.

For example, and referring again to FIG. 1, in the stowed configuration SC, the first wing element 240H is oriented with respect to the aft fuselage section 110 such that the first wing element longitudinal axis 240LA1 of the first wing element 240H is nominally parallel with the longitudinal axis LA of the fuselage, in particular of the aft fuselage section 110.

Referring again to FIGS. 2, 2(*a*), 2(*b*), 2(*c*), in the deployed configuration DC, the first wing element 240H is oriented with respect to the aft fuselage section 110 such that the first wing element longitudinal axis 240LA1 of the first wing element 240H is non-parallel with respect to the longitudinal axis LA. In at least this example, in the deployed configuration, the first wing element longitudinal axis 240LA1 is nominally orthogonal with the longitudinal axis LA of the fuselage, in particular of the aft fuselage section 110. In at least this example, in the deployed configuration, the first wing element longitudinal axis 240LA1 is nominally parallel with the pitch axis P of the air vehicle 100.

Referring in particular to FIG. 2(*c*), the wing system 200 further comprises a deployment system 400 configured for transitioning the wing system 200, in particular each wing module 240, from the stowed configuration SC to the deployed configuration DC.

Figure 3A:
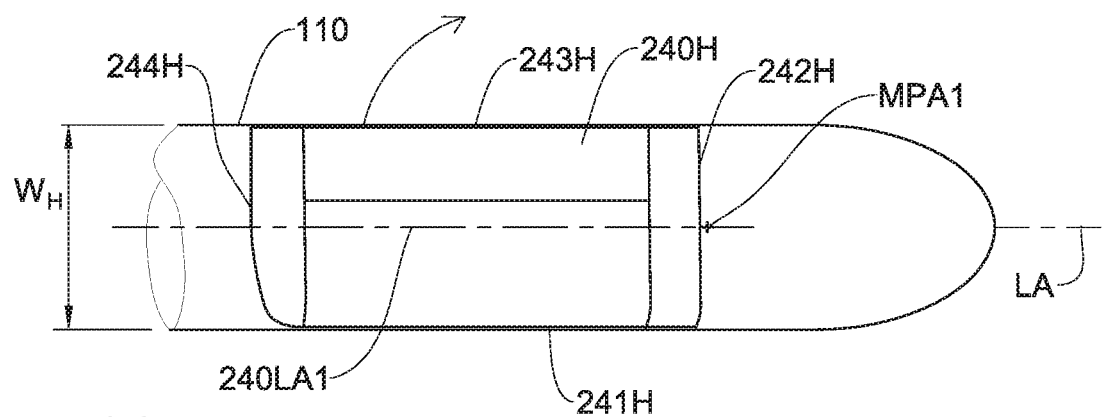
FIG. 3(a) is a side view of the example of FIG. 1 showing the first wing element in the stowed configuration.
Figure 3B:
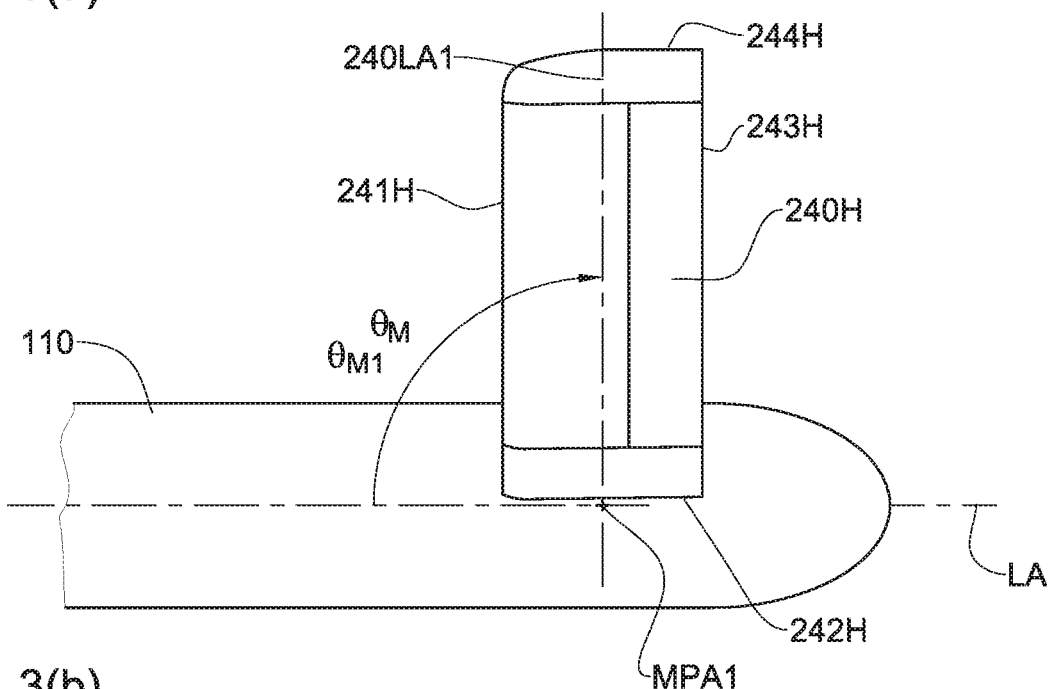
FIG. 3(b) is a side view of the example of FIG. 3(a) in a partially deployed configuration.
Figure 3C:
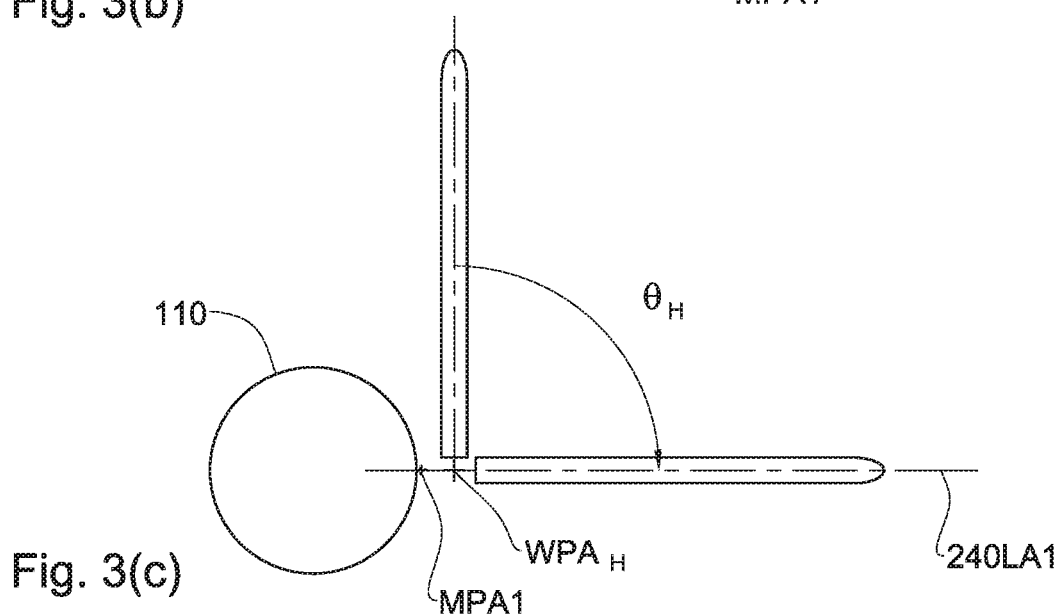
FIG. 3(c) is a front view of the example of FIG. 3(a) in deployed configuration.

In at least this example, and referring in particular to FIGS. 3(*a*), 3(*b*), 3(*c*), the deployment system 400 configured for deploying each first wing element 240H from the stowed configuration SC to the deployed configuration DC by:

pivoting the respective first wing element 240H about a respective first module pivot axis MPA1 by a non-zero module angular displacement $\theta_{M1}$, and pivoting the first wing element 240H about a respective first wing element pivot axis WPA$_H$ by a non-zero wing element angular displacement $\theta_H$.

It is to be noted that pivoting the first wing element 240H about respective first module pivot axis MPA1 essentially rotates the first wing element 240H along or generally parallel to the surface of the aft fuselage section 110, thereby orienting the leading edge 241H towards the forward end of the air vehicle 100 and the trailing edge 243H towards the aft end of the air vehicle 100, and concurrently essentially increases the spacing of the first wing element tip 244H with respect to the aft fuselage section 110, while concurrently the spacing of the first wing element root 242H with respect to the aft fuselage section 110 can remain unchanged, or changed by a much smaller amount. Such a rotation about respective first module pivot axis MPA1 is nominally over a vertical plane, at least in this example.

On the other hand, pivoting the first wing element 240H about the first wing element pivot axis WPA$_H$ orients the first wing element 240H in which leading edge 241H remains facing towards the forward end of the air vehicle 100, the trailing edge 243H remains facing towards the aft end of the air vehicle 100, and the first wing element tip 244H remains spaced with respect to the aft fuselage section 110 at a larger spacing than the spacing of the first wing element root 242H with respect to the aft fuselage section 110, but first wing element 240H is now in a general horizontal direction corresponding to the deployed configuration DC, at least in this example.

In at least this example, the first module pivot axis MPA1 is orthogonal with respect to the first wing element pivot axis WPA$_H$. In alternative variations of this example, for example, the first module pivot axis MPA1 is at a non-zero angle with respect to the first wing element pivot axis WPA$_H$, different from 90°.

In at least this example, the first module pivot axis MPA1 is parallel to a pitch axis P of the air vehicle 100. In alternative variations of this example, for example, the first module pivot axis MPA1 can be at a non-zero angle with respect to the pitch axis P, and can be at a non-zero angle, different from 90°, from the roll axis R.

In at least this example, the first wing element pivot axis WPA$_H$ is parallel to a roll axis R of the air vehicle 100. In alternative variations of this example, for example, the first wing element pivot axis WPA$_H$ is at a non-zero angle with respect to the roll axis R.

In at least this example, the first wing element pivot axis WPA$_H$ is parallel to a longitudinal axis LA of the air vehicle 100. In alternative variations of this example, for example, the first wing element pivot axis WPA$_H$ is at a non-zero angle with respect to the longitudinal axis LA.

In at least this example, the first wing element pivot axis WPA$_H$ is parallel to a chordline CL$_H$ of the first wing element 240H.

Figure 4A:
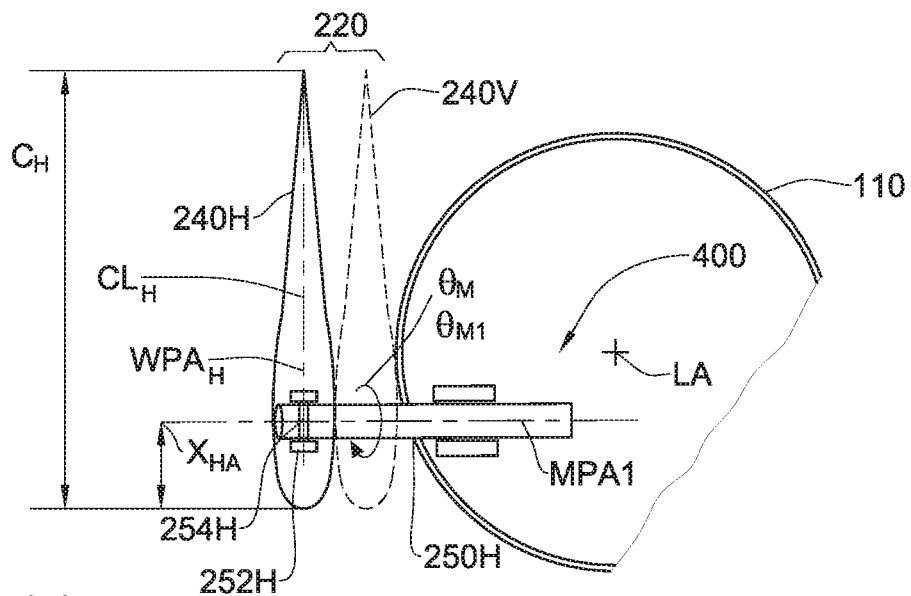
FIG. 4(a) is a transverse cross-sectional view of the example of FIG. 1 showing the first wing element in the stowed configuration.

For example, and referring to FIGS. 4(*a*), 4(*b*) and 4(*c*), the deployment system 400 comprises a shaft or journal 250H pivotably or rotatably mounted with respect to the aft fuselage section 110 in a manner enabling the wing module 220, or at least the respective first wing element 240H thereof, to pivot about the first module pivot axis MPA1, at least from the position at the stowed configuration SC (FIG.

Figure 4B:
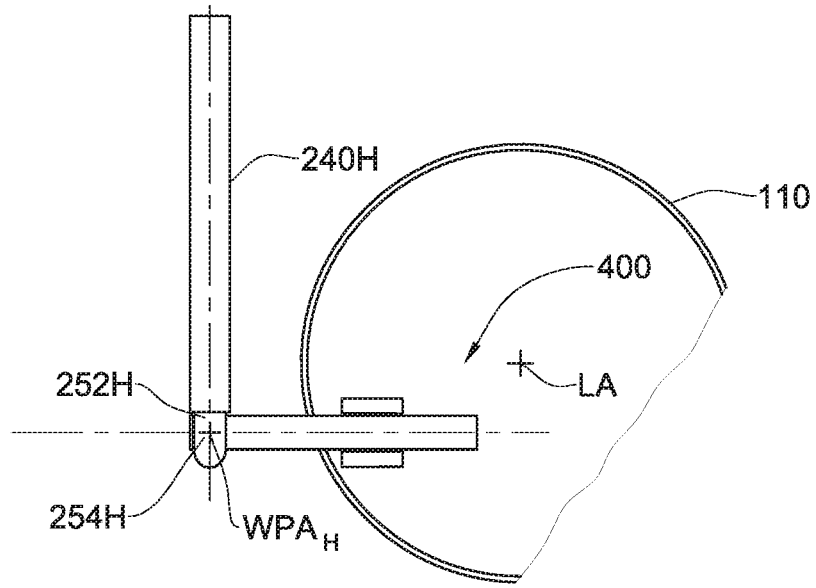
FIG. 4(b) is a transverse cross-sectional view of the example of FIG. 4(a) in a partially deployed configuration.

4(a)) to an intermediate position (FIG. 4(b)) following the non-zero module angular displacement $\theta_{M1}$.

Figure 4C:
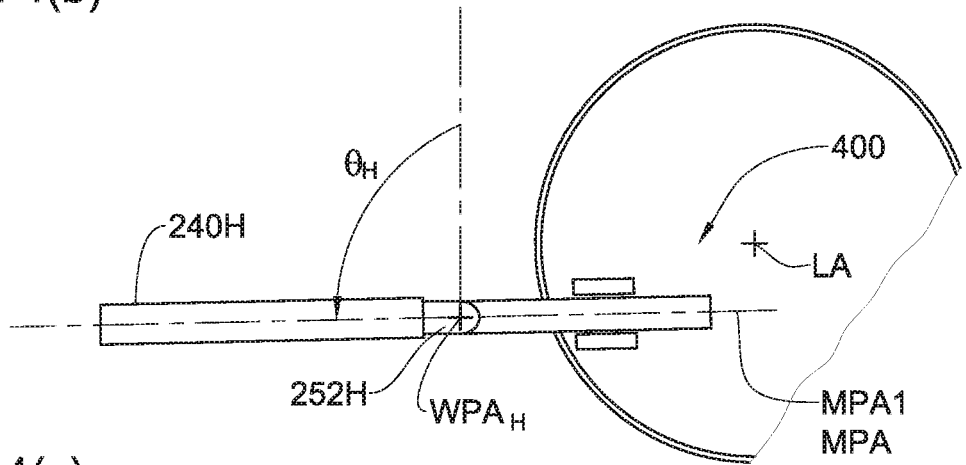
FIG. 4(c) is a transverse cross-sectional view of the example of FIG. 4(a) in deployed configuration.

Furthermore, the respective first wing element 240H is pivotably mounted to journal 250H, for example to a free end of the journal 250H outside of the aft fuselage section 110, via pin 254H and bracket 252H, such as to enable the first wing element 240H to pivot about the first wing element pivot axis $WPA_H$ with respect to journal 250H by non-zero wing element angular displacement $\theta_H$, from the intermediate position to the position corresponding to the deployed configuration DC (FIG. 4(c)).

The first module pivot axis MPA1 is located at a chordwise position $X_{HA}$ along the chord $C_H$ at the first wing element root 242H, from the leading edge thereof. For example the chordwise position $X_{HA}$ can be about 25% of the chord $C_H$ and/or about 1% to 2% of the chord $C_H$ forward of the aerodynamic center of the first wing element 240H (for example about 1% to 2% of the chord $C_H$ forward of the aerodynamic center of the first wing element root 242H).

Referring again to FIG. 1, the second wing element 240V in at least this example has a corresponding aerofoil cross-sectional profile $AE_V$ with chord $C_V$ at transverse sections along the second wing element second wing element longitudinal axis 240LA2 thereof, from the second wing element root 242V to the second wing element tip 244V. In this example the aerofoil cross-sectional profiles $AE_V$ have zero camber and generate zero aerodynamic force (i.e., have a lift coefficient of zero) corresponding to a zero angle of attack α to an airstream.

In at least this example, and referring also to FIG. 2(a), the second wing element 240V has a leading edge 241V, a trailing edge 243V, and a span $S_V$. The second wing element second wing element longitudinal axis 240LA2 extends along the length of the second wing element 240V between the second wing element root 242V and the second wing element tip 244V.

In at least this example the second wing element 240V is in plan form generally rectangular, and the aerofoil cross-sectional profile $AE_V$ is uniform in size and profile along the respective second wing element longitudinal axis 240LA2 of the second wing element 240V. Thus the second wing element 240V in at least this example the chord $C_V$ is uniform (and corresponds to the maximum chord of the second wing element 240V).

However, in alternative variations of this example the second wing element 240V can be, for example, in plan form generally trapezoidal (i.e., having a taper) or any other shape, and the aerofoil cross-sectional profile $AE_V$ is uniform in profile along the respective second wing element second wing element longitudinal axis 240LA2 of the second wing element 240V, but the size of the aerofoil cross-sectional profile $AE_V$ at each span-wise position along the second wing element longitudinal axis 240LA2 of the respective second wing element 240V can change in proportion to the size of the chord $C_V$ at the respective span-wise position. In such a case, the chord $C_V$ can vary between a maximum chord, and a minimum chord.

However, in yet other alternative variations of this example the second wing element 240V can be, for example, in plan form generally trapezoidal (i.e., having a taper) or any other shape, and the aerofoil cross-sectional profile $AE_V$ is non-uniform in profile along the respective second wing element second wing element longitudinal axis 240LA2 of the second wing element 240V, and furthermore the size of the aerofoil cross-sectional profile $AE_V$ at each span-wise position along the second wing element longitudinal axis 240LA2 of the respective second wing element 240V can change in proportion to the size of the chord $C_V$ at the respective span-wise position. In such a case, the chord $C_V$ can vary between a maximum chord, and a minimum chord.

In at least this example the second wing element 240V is non-swept, and thus the span $S_V$ is parallel to the second wing element longitudinal axis 240LA2. However, in alternative variations of this example, the second wing element 240V is swept, having for example a positive sweep angle or a negative sweep angle, and thus the span $S_V$ is non-parallel to the second wing element longitudinal axis 240LA2.

In at least one of the above examples the respective thickness to chord ratio along the respective second wing element longitudinal axis 240LA2 of the second wing element 240V can be uniform. Alternatively, in at least one variation of the above examples the respective thickness to chord ratio along the respective span of the second wing element 240V can be non-uniform. For example, respective thickness to chord ratio along the respective second wing element longitudinal axis 240LA2 can be reduced in a direction from the respective second wing element root 242V to the second wing element tip 244V.

Figure 5A:
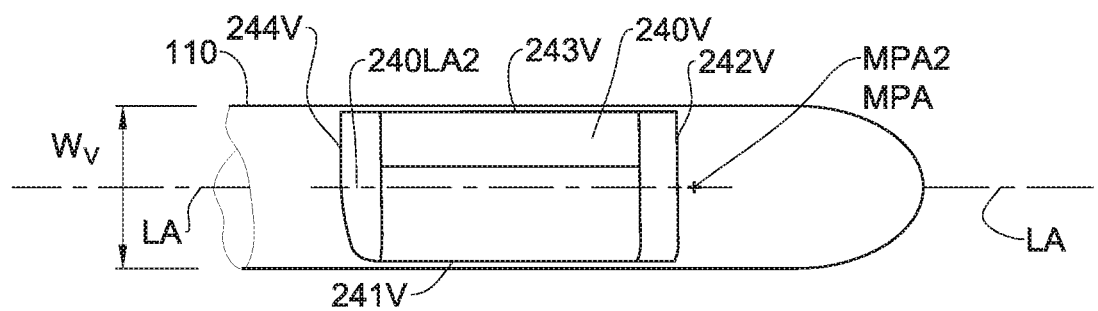
FIG. 5(a) is a side view of the example of FIG. 1 showing the second wing element in the stowed configuration.

It is to be noted that in plan view, and referring to FIG. 5(a), the second wing element 240V is configured with a maximum width $W_V$, wherein this width is taken orthogonal to the span $S_V$, and/or to the second wing element longitudinal axis 240LA2 of the second wing element 240V. Such a maximum width $W_V$ is correlated to the height HF of the aft fuselage section 110. For example, such a maximum width $W_V$ is about the same dimension as the height HF of the aft fuselage section 110, or within ±10% or within ±20% of the height HF of the aft fuselage section 110.

In at least this example the second wing element 240V comprises at least one control surface in the form of rudder 245V, which can be controllably operated to pivot about a pivot axis to provide selectively positive rudder deflections or negative rudder deflections to thereby enable control moments in yaw and roll to be generated, as will become clearer herein. In alternative variations of this example, the second wing element 240V itself is configured as an actuable monoblock rudder, which can be controllably operated to pivot about a suitable second wing element pivot axis to provide selectively positive rudder deflections or negative rudder deflections to thereby enable control moments in yaw and roll to be generated.

In at least this example, a suitable actuator system (not shown) is operatively coupled to the of rudder 245V as well as to the controller to control and carry out changes in rudder deflection angle. For example, such an actuator system can be embedded within the second wing element 240V itself, for example inside of the main body of the second d wing element 240V By way of non-limiting example, such an actuator system can include one or more of the Volz DA-30 or the Volz DA-15 servos, by Volz Servos GmbH & Co. KG, Germany.

Figure 2D:
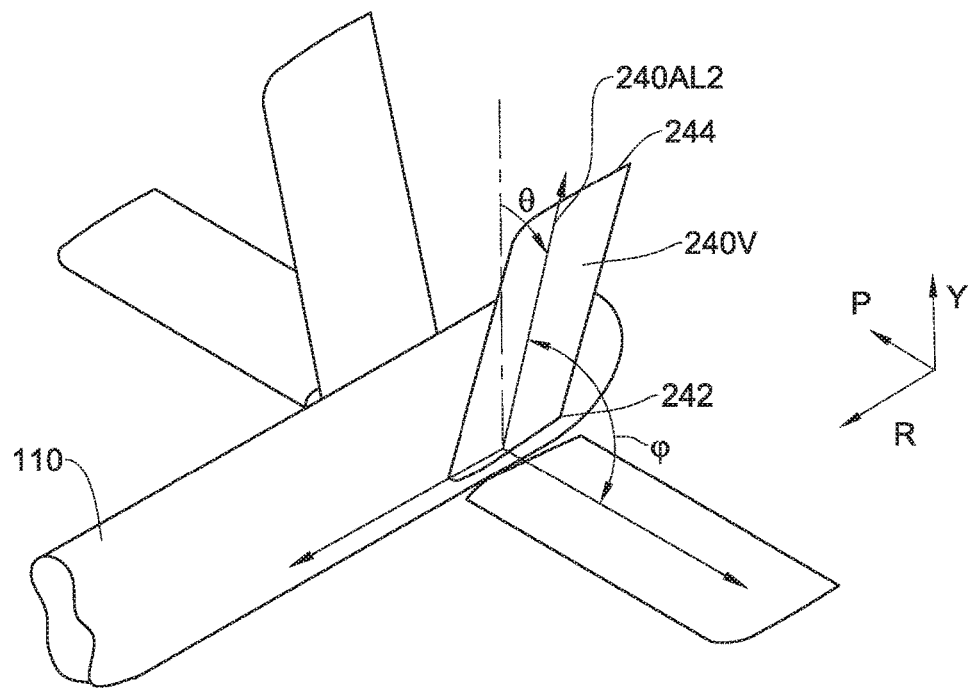
FIG. 2(d) is an isometric view of the example of FIG. 2 schematically illustrating displacement angles.
Figure 5B:
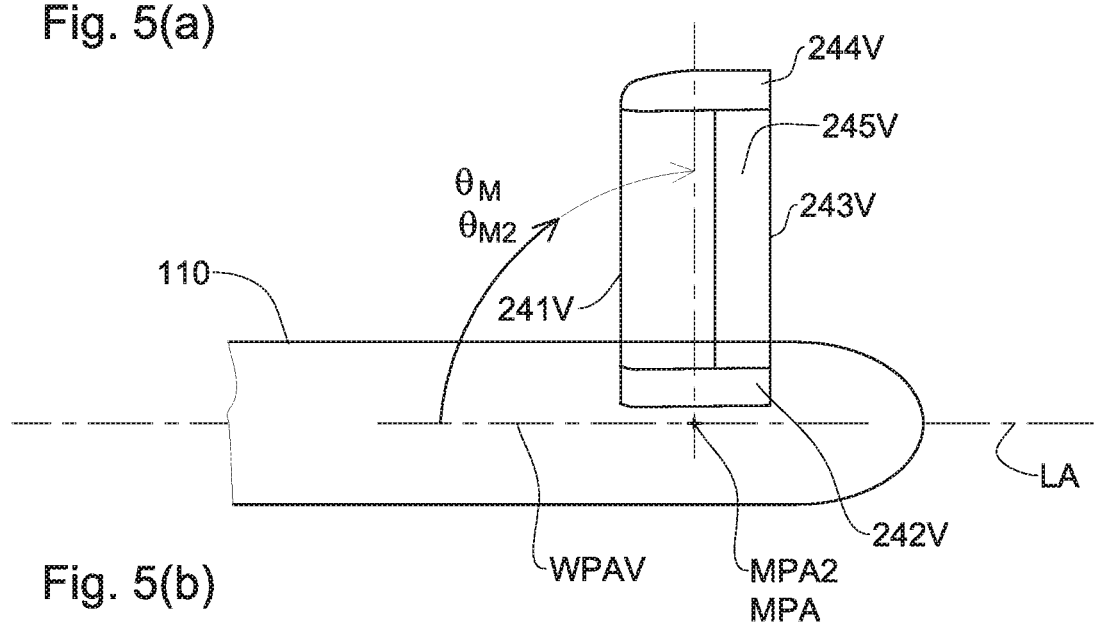
FIG. 5(b) is a side view of the example of FIG. 5(a) in the deployed configuration.
Figure 5C:
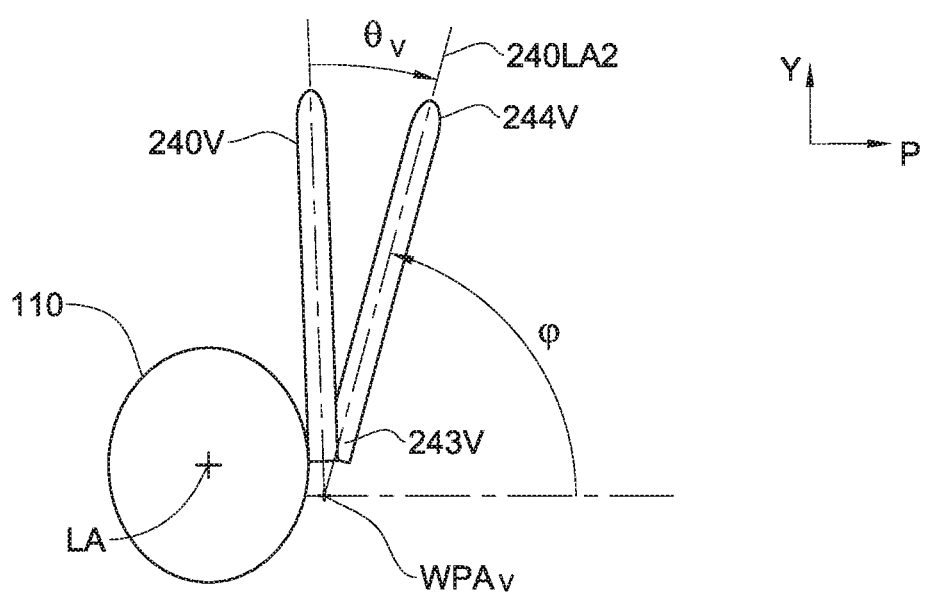
FIG. 5(c) is a front view of the example of FIG. 5(a).

Referring in particular to FIG. 2(d) and FIG. 5(c), in at least this example, in the deployed configuration DC, the second wing element 240V is oriented with respect to the aft fuselage section 110 at a desired cant angle φ from the horizontal, and the pivot axis of the rudder 245V is essentially parallel to the yaw axis Y of the air vehicle 100, or can be inclined to the second wing element longitudinal axis 240LA2. Furthermore, in the deployed configuration DC, the second wing element 240V is projecting outwardly and upwardly from the aft fuselage section 110 such that the second wing element tip 244V is at a greater spacing from the aft fuselage section 110 than second wing element root 242V. in at least some examples, providing a cant angle φ less than 90°, to thereby provide a divergent configuration of the two second wing element 240V of the wing system 200 with respect to the aft fuselage body 110, can minimize aerodynamic interference between the two second wing elements 240V.

Referring again to FIG. 1, in the stowed configuration SC, second wing element 240V is oriented with respect to the aft fuselage section 110 such that the second wing element longitudinal axis 240LA2 of the second wing element 240V is nominally parallel with the longitudinal axis LA of the fuselage, in particular of the aft fuselage section 110.

Referring again to FIGS. 2, 2(a), 2(b), 2(c), in the deployed configuration DC, the second wing element 240V is oriented with respect to the aft fuselage section 110 such that the second wing element longitudinal axis 240LA2 of the second wing element 240V is non-parallel with respect to the longitudinal axis LA. In at least this example, in the deployed configuration DC, the second wing element longitudinal axis 240LA2 is nominally orthogonal with the longitudinal axis LA of the fuselage, in particular of the aft fuselage section 110. In at least this example, in the deployed configuration DC, the second wing element longitudinal axis 240LA2 is lies on a pitch-yaw plane and inclined between with the pitch axis P and the yaw axis Y of the air vehicle 100.

Referring in particular to FIG. 2(c), the wing system 200 the deployment system 400 is further configured for transitioning the wing system 200, in particular each wing module 240, from the stowed configuration SC to the deployed configuration DC also with respect to the second wing elements 240V.

In at least this example, each wing deployment module 220 in the stowed configuration comprises a first wing root 242H of the first wing element 240H in overlying relationship with respect to a second wing root 242V of the second wing element 240V.

In at least this example, and referring in particular to FIGS. 5(a), 5(b), 5(c), the deployment system 400 is also configured for deploying or otherwise transitioning each second wing element 240V from the stowed configuration SC to the deployed configuration DC by:

pivoting the respective second wing element 240V about a respective second module pivot axis MPA2 by a non-zero module angular displacement $\theta_{M2}$; and optionally pivoting the second wing element 240V about a respective second wing element pivot axis WPA$_V$ by a non-zero wing element angular displacement $\theta_V$.

It is to be noted that for implementations of this and other examples in which the cant angle φ is set at 90°, while second wing element 240V is pivoted about a respective second module pivot axis MPA2 by a non-zero module angular displacement $\theta_{M2}$, when transitioning from the stowed configuration SC to the deployed configuration DC, no further transitioning is required. In other words, the step of pivoting the second wing element 240V about a respective second wing element pivot axis WPA$_V$ by a non-zero wing element angular displacement $\theta_V$, is omitted.

It is also to be noted that for implementations of this and other examples in which the cant angle φ is set at less 90°, while second wing element 240V is pivoted about a respective second module pivot axis MPA2 by a non-zero module angular displacement $\theta_{M2}$, when transitioning from the stowed configuration SC to the deployed configuration DC, no further transitioning is required. In other words, the step of pivoting the second wing element 240V about a respective second wing element pivot axis WPA$_V$ by a non-zero wing element angular displacement $\theta_V$, is omitted. In such cases the respective second module pivot axis MPA2 can be set at a corresponding angle to the pitch axis P and to the roll axis R, so that while in the stowed configuration SC the second wing element longitudinal axis 240LA2 of the second wing element 240V is parallel with respect to the longitudinal axis LA, in the deployed configuration DC the second wing element 240V is pivoted about the respective second module pivot axis MPA2 automatically providing the required cant angle.

It is to be noted that pivoting the second wing element 240V about respective second module pivot axis MPA2 essentially rotates the second wing element 240V along or generally parallel to the surface of the aft fuselage section 110, thereby orienting the leading edge 241V towards the forward end of the air vehicle 100 and the trailing edge 243V towards the aft end of the air vehicle 100, and concurrently essentially increases the spacing of the second wing element tip 244V with respect to the aft fuselage section 110, while concurrently the spacing of the second wing element root 242V with respect to the aft fuselage section 110 can remain unchanged, or changed by a much smaller amount. Such a rotation about respective second module pivot axis MPA2 is nominally over a vertical plane, at least in this example. In alternative variations of this example in which the cant angle φ is set at 90°, such a rotation about respective second module pivot axis MPA2 of module angular displacement $\theta_{M2}$ brings the second wing element 240V to its position corresponding to the deployed configuration DC.

On the other hand, in for example this example in which the cant angle φ is set at less than 90°, pivoting second wing element 240V about the second wing element pivot axis WPA$_V$ orients the second wing element 240V in which leading edge 241V remains facing towards the forward end of the air vehicle 100, the trailing edge 243V remains facing towards the aft end of the air vehicle 100, and the second wing element tip 244V remains spaced with respect to the aft fuselage section 110 at a larger spacing than the spacing of the second wing element root 242V with respect to the aft fuselage section 110, but second wing element 240V is now inclined to a vertical plane at wing element angular displacement $\theta_V$, corresponding to the deployed configuration DC. In the illustrated example, the second wing element 240V is at a cant angle φ of less than 90°, for example 75°. Thus in addition to the aforementioned pivoting the second wing element 240V about the first module pivot axis MPA2 by non-zero module angular displacement $\theta_{M2}$, the second wing element 240V is further pivoted about a respective second wing element pivot axis WPA$_V$ by a non-zero second wing element angular displacement $\theta_V$.

Thus, in at least this example, the second wing element angular displacement $\theta_V$ is related to cant angle φ by the expression:

$$\theta_V = 90° + -\varphi$$

In at least this example, the second module pivot axis MPA2 is orthogonal with respect to the second wing element pivot axis WPA$_V$. In alternative variations of this example, for example, the second module pivot axis MPA2 is at a non-zero angle with respect to the second wing element pivot axis WPA$_V$, different from 90°.

In at least this example, the second module pivot axis MPA2 is parallel to a pitch axis P of the air vehicle 100. In alternative variations of this example, for example, the second module pivot axis MPA2 is at a non-zero angle with respect to the pitch axis P, and can be at a non-zero angle, different from 90°, from the roll axis R.

In at least this example, the second wing element pivot axis $WPA_V$ is parallel to a roll axis R of the air vehicle 100. In alternative variations of this example, for example, the second wing element pivot axis $WPA_V$ is at a non-zero angle with respect to the roll axis R.

In at least this example, the second wing element pivot axis $WPA_V$ is parallel to a longitudinal axis LA of the air vehicle 100. In alternative variations of this example, for example, the second wing element pivot axis $WPA_V$ is at a non-zero angle with respect to the longitudinal axis LA.

In at least this example, the second wing element pivot axis $WPA_V$ is parallel to a chordline $CL_V$ of the second wing element 240V.

Figure 6A:
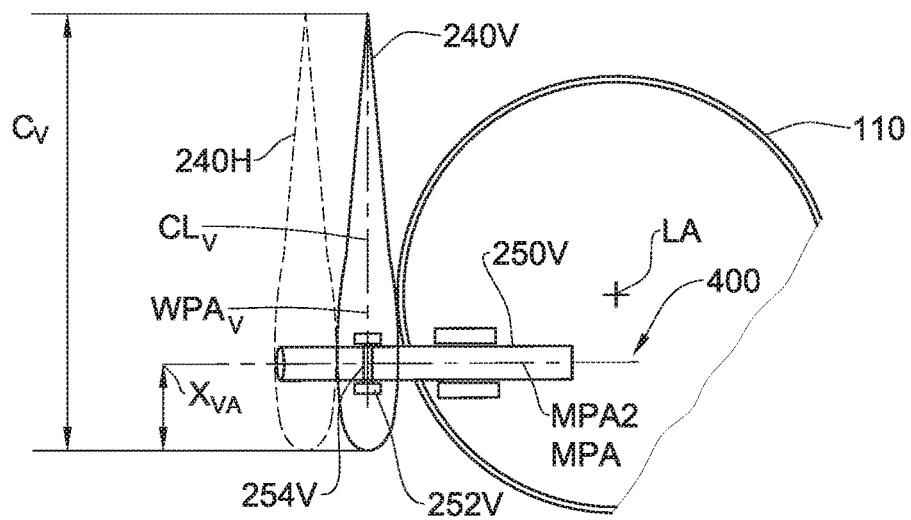
FIG. 6(a) is a transverse cross-sectional view of the example of FIG. 1 showing the second wing element in the stowed configuration.
Figure 6B:
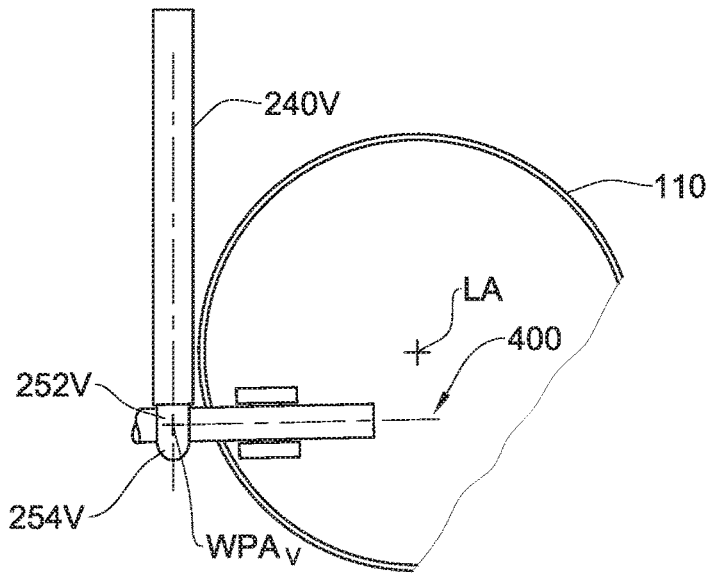
FIG. 6(b) is a transverse cross-sectional view of the example of FIG. 6(a) in a partially deployed configuration.
Figure 6C:
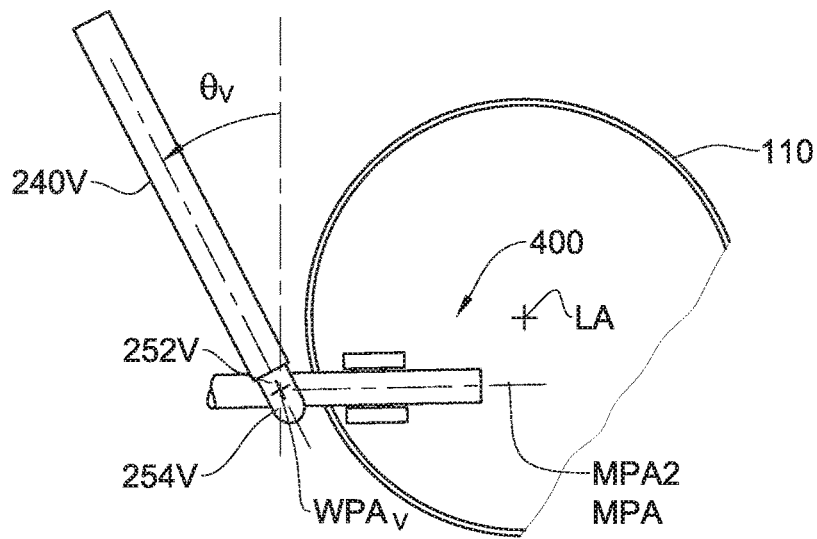
FIG. 6(c) is a transverse cross-sectional view of the example of FIG. 6(a) in deployed configuration.

For example, and referring to FIGS. 6(a), 6(b) and 6(c), the deployment system 400 comprises a shaft or journal 250V pivotably or rotatably mounted with respect to the aft fuselage section 110 in a manner enabling at least the respective second wing element 240V of the wing module 220, to pivot about the second module pivot axis MPA2, at least from the position at the stowed configuration SC (FIG. 6(a)) to an intermediate position (FIG. 6(b)) following the non-zero module angular displacement $\theta_{M2}$.

Furthermore, the respective second wing element 240V is pivotably mounted to journal 250V, for example to a free end of the journal 250V outside of the aft fuselage section 110, via pin 254V and bracket 252V, such as to enable the second wing element 240V to pivot about the second wing element pivot axis $WPA_V$ with respect to journal 250V by non-zero wing element angular displacement $\theta_V$, from the intermediate position to the position corresponding to the deployed configuration DC (FIG. 6(c)).

The second module pivot axis MPA2 is located at a chordwise position $X_{V4}$ along the chord $C_V$ at the second wing element root 242V, from the leading edge thereof. For example the chordwise position $X_{V4}$ can be about 25% of the chord $C_V$ and/or about 1% to 2% of the chord $C_V$ forward of the aerodynamic center of the second wing element 240V (for example about 1% to 2% of the chord $C_V$ forward of the aerodynamic center of the second wing element root 242V).

In at least this example, the first module pivot axis MPA1 is parallel to second module pivot axis MPA2. Furthermore, in at least this example, the first module pivot axis MPA1 is co-axial with second module pivot axis MPA2.

According to some examples, at least one of the first module pivot axis MPA1 and the second module pivot axis MPA2 is parallel to a pitch axis P of the air vehicle 100. However, in at least the illustrated example, the first module pivot axis MPA1 and the second module pivot axis MPA2 are both parallel to a pitch axis P of the air vehicle 100.

In at least this example, the first wing element pivot axis $WPA_H$ and said second wing element pivot axis $WPA_V$ are parallel to one another.

According to an aspect of the presently disclosed subject matter, at least one of said first wing element pivot axis $WPA_H$ and said second wing element pivot axis $WPA_V$ is parallel to a roll axis R of the air vehicle 100. In at least this example, the first wing element pivot axis $WPA_H$ and the second wing element pivot axis $WPA_V$ are parallel to a roll axis R of the air vehicle 100.

In at least this example, the first journal 250H is parallel to second journal 250V. Furthermore, in at least this example, the first journal 250H is co-axial with second journal 250V. Furthermore, in at least this example, the first journal 250H and the second journal 250V constitute a single integrated journal, i.e., the first journal 250H and the second journal 250V are one and the same journal. Furthermore, in at least this example, the first module pivot axis MPA1 and the second module pivot axis MPA2 are the same axis, and can be referred to as the module pivot axis MPA Similarly, in at least this example, the first non-zero module angular displacement $\theta_{M1}$ and the second non-zero module angular displacement $\theta_{M2}$ refer to the same angular displacement, since the wing module 220 pivots about the module pivot axis MPA as a unit, and can be referred to as the module angular displacement $\theta_M$.

In at least some other alternative variations of this example, the first journal 250H is co-axial with second journal 250V but the first journal 250H and the second journal 250V are different from one another. For example, the first journal 250H is accommodated within a lumen provided in the second journal 250V.

It is to be noted that in at least some other alternative variations of this example, the first module pivot axis MPA1 is parallel and spaced from second module pivot axis MPA2. For example, the first journal 250H is parallel and spaced from second journal 250V. In other words, the first journal 250H is not co-axial with, and is different from, the second journal 250V.

In at least this example, in the stowed configuration SC, the first wing element 240H and the second wing element 240V are in overlying spatial relationship, in which one aerofoil surface of the first wing element 240H is facing one of the two aerofoil surface of the second wing element 240V.

In at least this example, and referring to FIG. 1, in the aforesaid overlying spatial relationship, the first wing element root 242H is in close proximity to the second wing element root 242V. For example, the first wing element root 242H is overlying the second wing element root 242V.

In particular, in at least this example, in the stowed configuration SC the first wing element 240H and the second wing element 240V are in overlying spatial relationship, in which the first wing element longitudinal axis 240LA1 is parallel to the second wing element longitudinal axis 240LA2, with respect to the aft fuselage section 110.

Furthermore, at least this example, in the aforesaid lateral superposed spatial relationship, the first wing element 240H is outboard of the second wing element 240V, with respect to the aft fuselage section 110. Said differently, in the aforesaid lateral superposed spatial relationship, the second wing element 240V is inboard of the first wing element 240H, with respect to the aft fuselage section 110.

Furthermore in at least this example, the first wing element 240H and the second wing element 240V are similar or identical in size. For example the first wing element span $S_H$ is similar or identical to the second wing element span $S_V$. Similarly, the first wing element chords $C_H$ are similar or identical to the second wing element chords $C_V$.

In at least some variations of this example, the first wing element 240H and the second wing element 240V are not similar in size. For example the first wing element span $S_H$ is different in magnitude with respect to the second wing element span $S_V$, and/or, the first wing element chords $C_H$ are different in magnitude with respect to the second wing element chords $C_V$.

In at least this example, the first wing element 240H and the second wing element 240V are configured for pivoting together as a unit, and in the same rotational direction, when pivoting about the respective first module pivot axis MPA1 and second module pivot axis MPA2. Thus, the first module angular displacement $\theta_{M1}$ and the second module angular displacement $\theta_{M2}$ are nominally equal to one another. Thus, in at least this example, in the stowed configuration SC the first wing element 240H and the second wing element 240V are in the aforesaid overlying spatial relationship, and in which the first wing element leading edge 241H is generally overlying the second wing element leading edge 241V, and the first wing element trailing edge 243H is generally overlying the second wing element trailing edge 243V.

In at least this example, the first wing element 240H and the second wing element 240V are pivoted by the first module angular displacement $\theta_{M1}$ and the second module angular displacement $\theta_{M2}$, respectively, which are nominally equal to one another, and which result in the chord $C_H$ of the first wing element 240H being generally parallel with the longitudinal axis LA of the aft fuselage section 110 or of the air vehicle 100. This provides a zero incidence angle for the first wing elements 240H.

Figure 2E:
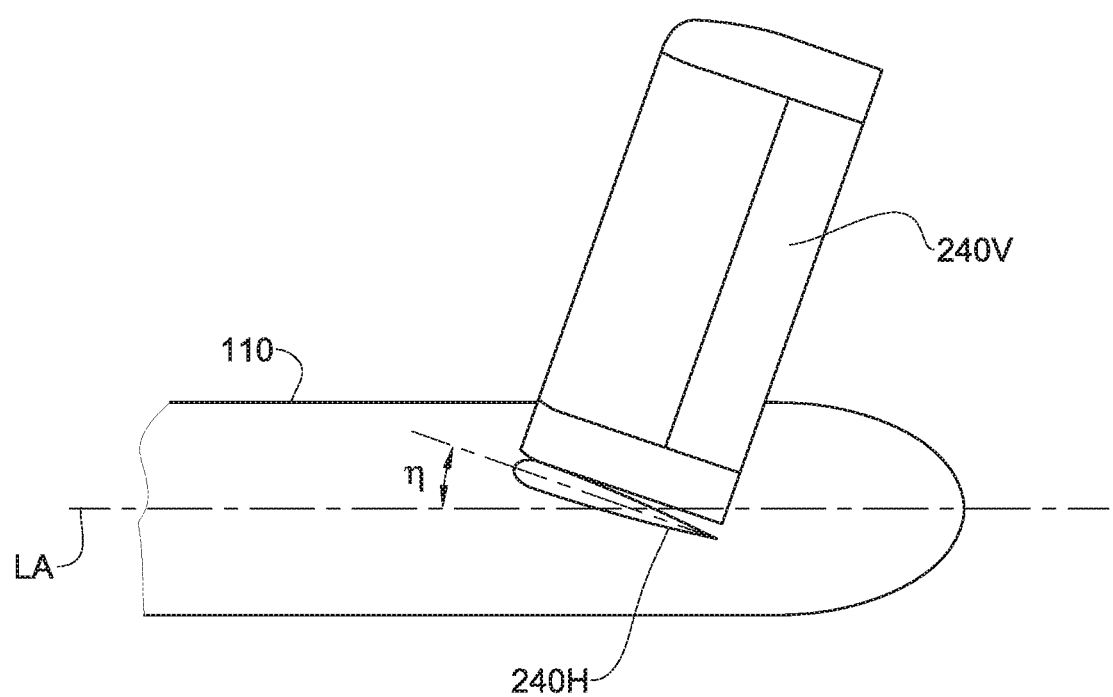
FIG. 2(e) is a side view of an alternative variation of the example of FIG. 2 having a non-zero incidence angle.

However, and referring to FIG. 2(e), in at least one alternative variation of this example, the first wing element 240H and the second wing element 240V are pivoted by the first module angular displacement $\theta_{M1}$ and the second module angular displacement $\theta_{M2}$, respectively, which are nominally equal to one another, and which result in the chord $C_H$ of the first wing element 240H being generally non-parallel with the longitudinal axis LA of the aft fuselage section 110 or of the air vehicle 100. This provides a non-zero incidence angle $\eta$ for the first wing elements 240H.

In at least some alternative variations of this example, the first wing element 240H and the second wing element 240V are configured for pivoting concurrently, either in the same rotational direction or in opposite rotational directions one from the other, when pivoting about the respective first module pivot axis MPA1 and second module pivot axis MPA2. The respective first module angular displacement $\theta_{M1}$ and second module angular displacement $\theta_{M2}$ can be nominally equal to one another, or different from one another, in such examples. In examples in which the first wing element 240H and the second wing element 240V are not pivoting together relative to the respective first module pivot axis MPA1 and second module pivot axis MPA2, the movement can be coordinated by a suitable gear system, for example, to ensure timing, and also to better utilize the aerodynamic loads to alleviate the actuator loading during deployment, at wide range of flight conditions.

In at least some alternative variations of this example, the first wing element 240H and the second wing element 240V are configured for pivoting sequentially, when respectively pivoting about the respective first module pivot axis MPA1 and second module pivot axis MPA2. In such examples, the first module angular displacement $\theta_{M1}$ and the second module angular displacement $\theta_{M2}$ can be nominally equal to one another, or different from one another. Furthermore in such examples the first wing element 240H and the second wing element 240V can be configured for pivoting in the same rotational direction, or can be configured for pivoting in opposite rotational directions. The respective first module angular displacement $\theta_{M1}$ and second module angular displacement $\theta_{M2}$ can be nominally equal to one another, or different from one another, in such examples.

In examples in which the respective first wing element 240H and the respective second wing element 240V are configured for pivoting (concurrently or sequentially) in the same rotational direction, in the respective stowed configuration SC the respective first wing element 240H and the respective second wing element 240V are in the aforesaid overlying spatial relationship, and in which the respective first wing element leading edge 241H is generally overlying the respective second wing element leading edge 241V, and the respective first wing element trailing edge 243H is generally overlying the respective second wing element trailing edge 243V.

In examples in which the respective first wing element 240H and the respective second wing element 240V are configured for pivoting (concurrently or sequentially) in the opposite rotational directions, in the respective stowed configuration SC the respective first wing element 240H and the respective second wing element 240V are in the aforesaid overlying spatial relationship, and in which the respective first wing element leading edge 241H is generally overlying the respective second wing element trailing edge 243V, and the respective first wing element trailing edge 243H is generally overlying the respective second wing element leading edge 241V.

It is to be noted that once each of the respective first wing element 240H and the respective second wing element 240V reaches the respective deployed position corresponding to the deployed configuration DC, the respective first wing element 240H and the respective second wing element 240V are locked in position, for example via any suitable mechanical lock. For example, such a mechanical lock can be provided using a suitable pin and lug system, as are known in the art for example. Alternatively, such a mechanical lock can be in the form of spring loaded wedge element, for example.

Suitable actuators (not shown) are provided for actuating the first wing element 240H and the respective second wing element 240V of each module 220, to cause the first wing element 240H and the respective second wing element 240V to rotate as required about the respective first module pivot axis MPA1 and second module pivot axis MPA2, to provide the first module angular displacement $\theta_{M1}$ and second module angular displacement $\theta_{M2}$, and to cause the first wing element 240H and the respective second wing element 240V to rotate as required about the respective first wing element pivot axis $WPA_H$ and second wing element pivot axis $WPA_V$, through respective first wing element angular displacement $\theta_H$ and second wing element angular displacement $\theta_V$, as required by the respective deployment method. Such actuators can comprise, for example, suitable prestressed springs that provide a torque when selectively released, corresponding to actuation of the actuator. For example, a coil spring can be configured to provide both torsion and compression forces to rotate each one of the first wing element 240H and the respective second wing element 240V about the respective first module pivot axis MPA1 and second module pivot axis MPA2, and lock it into place.

Suitable dampers (not shown) can be provided for dampening the rotation of the first wing element 240H and the respective second wing element 240V about the respective first module pivot axis MPA1 and second module pivot axis MPA2. Such dampers can be configured for limiting the rate of rotation and limiting transmission of loads to the air vehicle. Suitable dampers (not shown) can also be provided for dampening the rotation of the first wing element 240H and the respective second wing element 240V about the respective first wing element pivot axis $WPA_H$ and second wing element pivot axis $WPA_V$.

Such dampers can be configured for limiting the rate of rotation and limiting transmission of loads to the air vehicle. For example, such dampers can include linear oil dampers, which are well known in the art.

In at least this example, the first module angular displacement $\theta_{M1}$ is between 80° and 100°; for example the first module angular displacement $\theta_{M1}$ is about 90°. For example, the first module angular displacement $\theta_{M1}$ is such as to enable the first wing element 240H to adopt a zero incidence angle, or alternatively a non-zero incidence angle in the deployed configuration DC.

In at least this example, the second module angular displacement $\theta_{M2}$ is between 80° and 100°; for example the second module angular displacement $\theta_{M2}$ is about 90°.

In at least this example, the first module angular displacement $\theta_{M1}$ and the second module angular displacement $\theta_{M2}$ are equal to one another. Furthermore, the wing deployment module 220 is configured for pivoting as a unit about at least one of first module pivot axis MPA1 and the second module pivot axis MPA2.

In at least this example, the first wing element angular displacement $\theta_H$ is between 70° and 110°; for example the first wing element angular displacement $\theta_H$ is about 90°.

In at least some examples, the second wing element angular displacement $\theta_V$ is between −20° and +20°. For positive second wing element angular displacement $\theta_V$, the respective second wing elements 240V of the port wing module 220P and of the starboard wing module 220S are in diverging relationship with respect to the fuselage aft section 110. For negative second wing element angular displacement $\theta_V$, the second wing elements 240V of the port wing module 220P and of the starboard wing module 220S are in converging relationship with respect to the fuselage aft section 110.

In at least this example, the second wing element angular displacement $\theta_V$ is about 15°, or can be in any suitable angle in the range between 0° and 15°. In at least one alternative variation of this example, the second wing element angular displacement $\theta_V$ is about 0°.

Two examples of such a deployment method are now disclosed.

First Example of Deployment Method

Figure 8A:
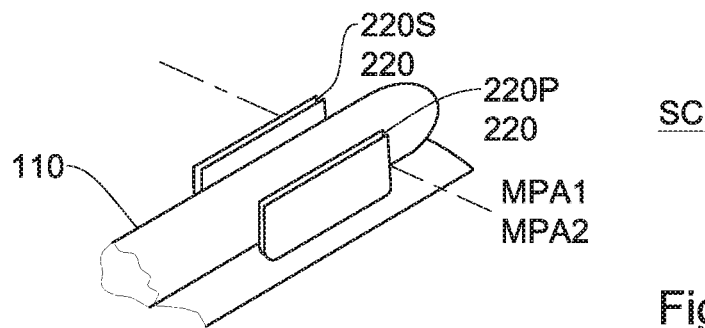
FIGS. 8(a) to 8(d) schematically illustrate an example of a method for deploying the example of FIG. 1 from the stowed configuration to the deployed configuration.
Figure 8B:
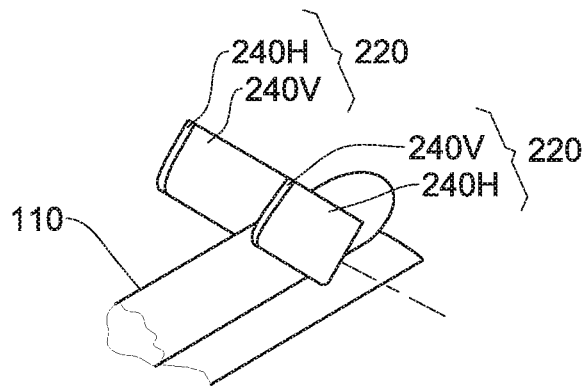
Figure 8C:
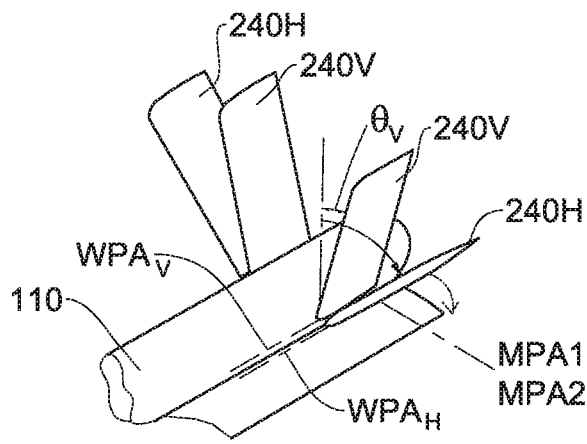
Figure 8D:
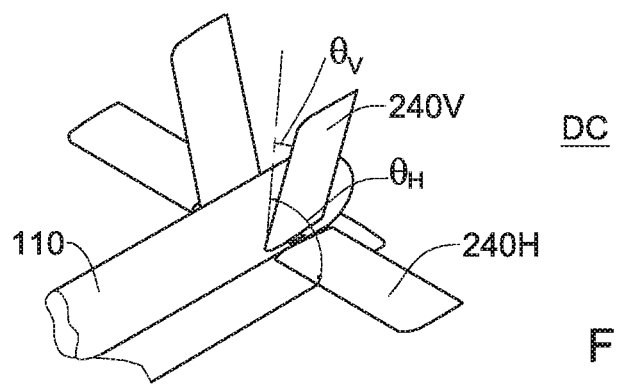
Figure 9:
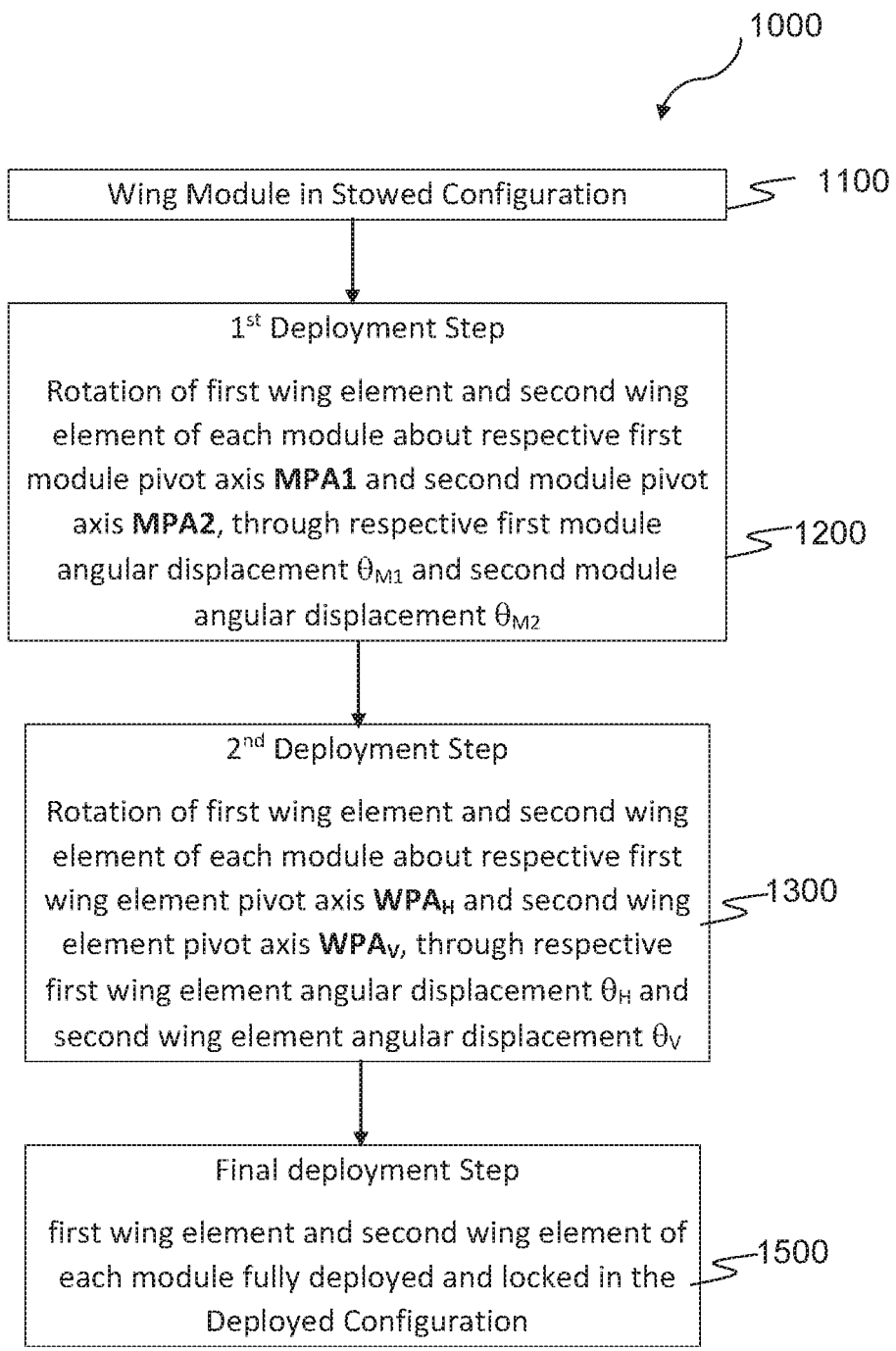
FIG. 9 schematically illustrates the steps of the method of the example of FIGS. 8(a) to 8(d).

Referring to FIGS. 8(a), 8(b), 8(c), 8(d), and to FIG. 9, a first deployment method 1000 is illustrated for the wing system 200.

As will become clearer herein, according to method 1000, the wing system 200 is configured for deploying each wing deployment module 220 from the stowed configuration SC to the deployed configuration DC by:
(a) pivoting the first wing element 240H about the first module pivot axis MPA1 by said non-zero first module angular displacement $\theta_{M1}$ and pivoting the second wing element 240V about the second module pivot axis MPA2 by said non-zero second module angular displacement $\theta_{M2}$; and
(b) pivoting said first wing element 240H about the first wing element pivot axis $WPA_H$ by said non-zero first wing element angular displacement $\theta_H$.

In particular, according to method 1000, the wing system 200 is configured for deploying each wing deployment module 220 from the stowed configuration SC to the deployed configuration DC by:
(a) concurrently pivoting the first wing element 240H about the first module pivot axis MPA1 by said non-zero first module angular displacement $\theta_{M1}$ and the second wing element 240V about the second module pivot axis MPA2 by said non-zero second module angular displacement $\theta_{M2}$;
(b) subsequent to step (a), pivoting said first wing element 240H about the first wing element pivot axis $WPA_H$ by said non-zero first wing element angular displacement $\theta_H$.

Furthermore, in the method 1000 for examples in which second wing element angular displacement is non-zero, the wing system 200 is configured for deploying each wing deployment module 220 from the stowed configuration SC to the deployed configuration DC by:
(c) subsequent to step (a), pivoting said second wing element 240V about the second wing element pivot axis $WPA_V$ by said non-zero second wing element angular displacement $\theta_V$.

Thus, this method 1000 can be considered to be characterized in that, for each module 220, the respective first wing element 240H and the respective second wing element 240V are sequentially deployed from the stowed configuration SC to the deployed configuration DC.

Referring in particular to FIG. 8(a), in step 1100 the respective first wing element 240H and the respective second wing element 240V of each module 220 are in the stowed configuration SC, in the aforementioned overlying relationship.

In the first deployment step 1200, and referring in particular to FIG. 8(b), the respective first wing element 240H and the respective second wing element 240V of each module 220 are concurrently rotated about respective first module pivot axis MPA1 and second module pivot axis MPA2, through respective first module angular displacement $\theta_{M1}$ and second module angular displacement $\theta_{M2}$. In this example, the first module pivot axis MPA1 and second module pivot axis MPA2 are coaxial, and the first module angular displacement $\theta_{M1}$ and second module angular displacement $\theta_{M2}$ are equal to one another. For example, first module angular displacement $\theta_{M1}$ and second module angular displacement $\theta_{M2}$ are each about 90°. The respective first wing element 240H and the respective second wing element 240V of each module 220 are then locked in place in terms of preventing further pivoting about the respective first module pivot axis MPA1 and second module pivot axis MPA2. In step 1200 there is no rotation of the respective module 220 about the respective first wing element pivot axis $WPA_H$ and second wing element pivot axis $WPA_V$.

In the second deployment step 1300, and referring in particular to FIG. 8(c), the respective first wing element 240H and the respective second wing element 240V of each module 220 are rotated about respective first wing element pivot axis $WPA_H$ and second wing element pivot axis $WPA_V$, through respective first wing element angular displacement $\theta_H$ and second wing element angular displacement $\theta_V$. In this example, the first wing element pivot axis $WPA_H$ and second wing element pivot axis $WPA_V$ are nominally parallel. For example, first wing element angular displacement $\theta_H$ is about 90°, while second wing element angular displacement $\theta_V$ is about 15°. In at least some alternative variations of this example, second wing element angular displacement $\theta_V$ is zero, and thus in respective the second deployment step 1300, while the respective first wing element 240H of each module 220 is rotated about respective first wing element pivot axis $WPA_H$ through respective first wing element angular displacement $\theta_H$, the respective second wing element 240V is not pivoted about the second wing element pivot axis $WPA_V$.

In the illustrated example, the respective first wing element 240H and the respective second wing element 240V of each module 220 can be concurrently rotated about respective first wing element pivot axis $WPA_H$ and second wing element pivot axis $WPA_V$, until the respective second wing element 240V reaches its respective second wing element angular displacement $\theta_V$, and thereafter the respective first wing element 240H continues to pivot about respective first wing element pivot axis $WPA_H$ until it reaches its respective first wing element angular displacement $\theta_H$. Alternatively, the respective first wing element 240H is first rotated about respective first wing element pivot axis $WPA_H$ until the respective first wing element 240H reaches its respective first wing element angular displacement $\theta_H$, and thereafter the respective second wing element 240V is rotated about respective second wing element pivot axis $WPA_V$ to pivot about respective second wing element pivot axis $WPA_V$ until it reaches its respective second wing element angular displacement $\theta_V$.

In the final deployment step 1500, and referring in particular to FIG. 8(d), once the respective first wing element 240H and the respective second wing element 240V of each module 220 reach their respective first wing element angular displacement $\theta_H$ and respective second wing element angular displacement $\theta_V$, the respective first wing element 240H and the respective second wing element 240V of each module 220 are then locked in place in terms of preventing further pivoting about the respective first wing element pivot axis $WPA_H$ and second wing element pivot axis $WPA_V$, to provide the deployed configuration DC.

Without being bound by theory, inventors consider that a positive deployment moment is to be expected along most of first deployment step 1200, at all relevant flight conditions, alleviating actuation requirements for rotating the respective first wing element 240H and the respective second wing element 240V of each module 220 about respective first module pivot axis MPA1 and second module pivot axis MPA2.

However, and again without being bound by theory, inventors consider that an initial small negative deployment moment could exist at the beginning of the first deployment step 1200, particular at negative angles of attack.

Second Example of Deployment Method

Figure 10A:
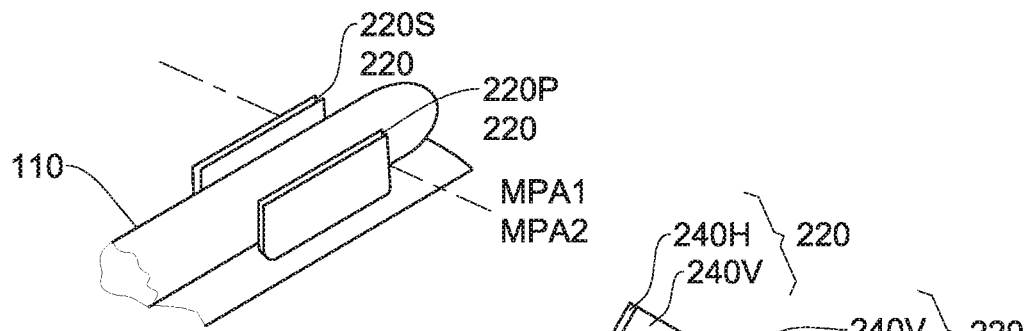
FIGS. 10(a) to 10(e) schematically illustrate an example of a method for deploying the example of FIG. 1 from the stowed configuration to the deployed configuration.
Figure 10B:
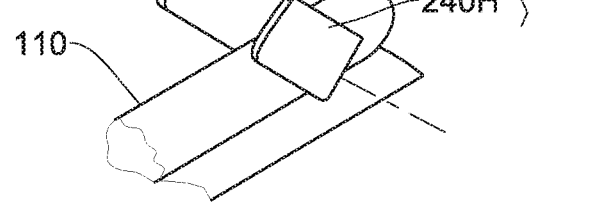
Figure 10C:
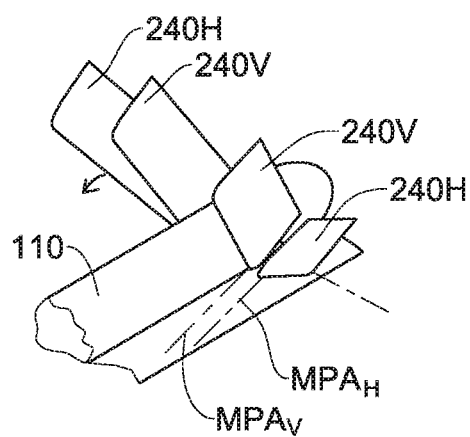
Figure 10D:
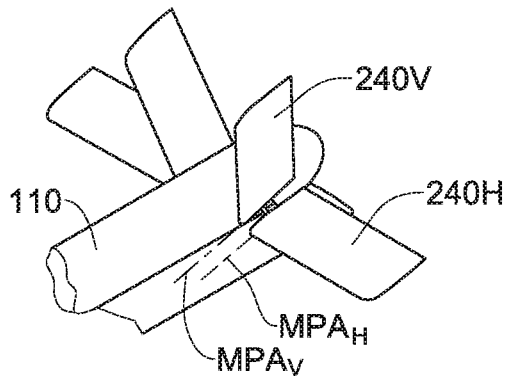
Figure 11:
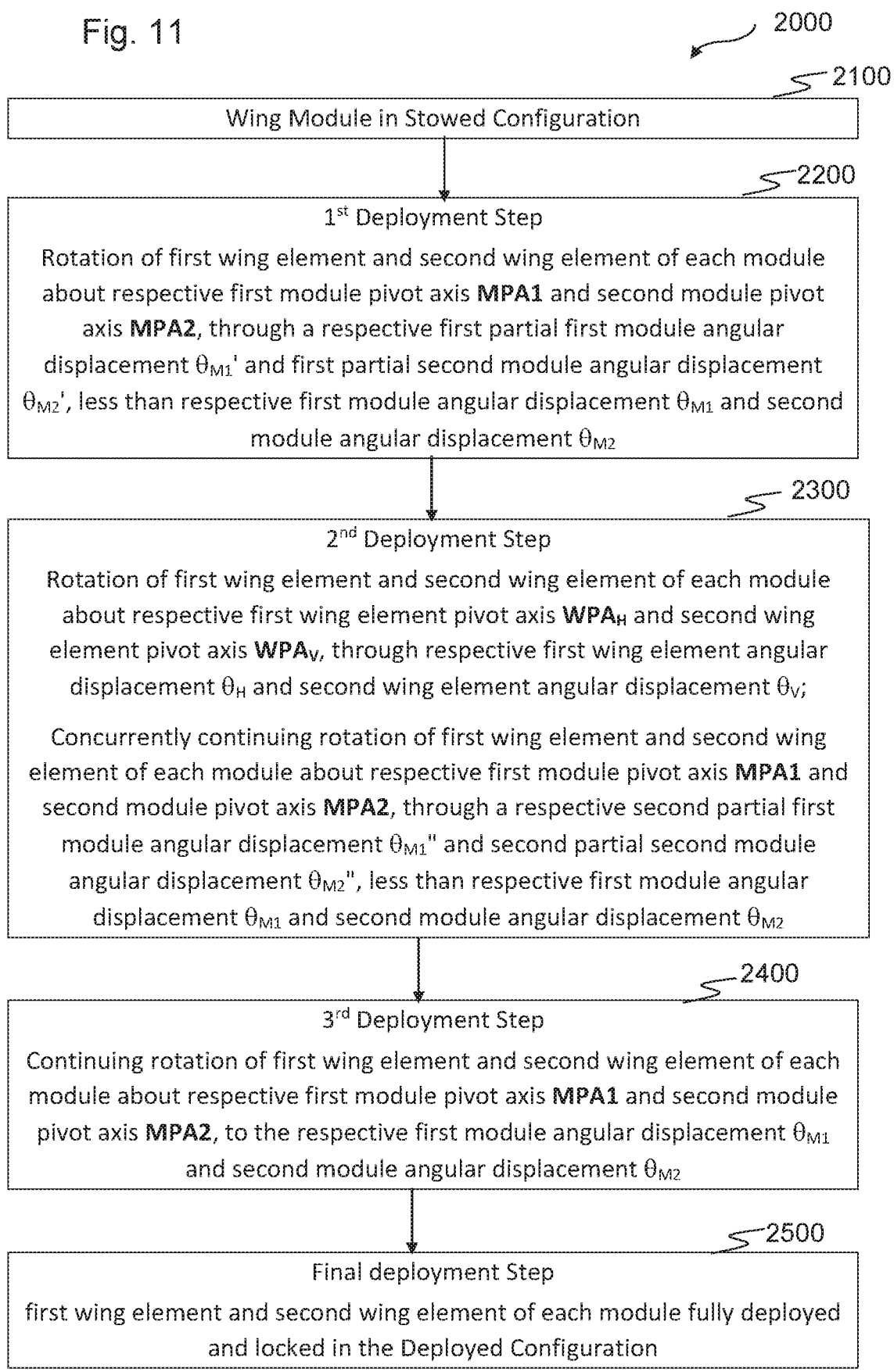
FIG. 11 schematically illustrates the steps of the method of the example of FIGS. 10(a) to 10(e).

Referring to FIGS. 10(a), 10(b), 10(c), 10(d), and to FIG. 11, a second deployment method 2000 is illustrated for the wing system 200.

As will become clearer herein, according to method 2000, the wing system 200 is configured for deploying each wing deployment module 220 from the stowed configuration SC to the deployed configuration DC by:
(a) pivoting the first wing element 240H about the first module pivot axis MPA1 by said non-zero first module angular displacement $\theta_{M1}$ and pivoting the second wing element 240V about the second module pivot axis MPA2 by said non-zero second module angular displacement $\theta_{M2}$; and
(b) pivoting said first wing element 240H about the first wing element pivot axis $WPA_H$ by said non-zero first wing element angular displacement $\theta_H$.

In particular, according to method 2000, the wing system 200 is configured for deploying each wing deployment module 220 from the stowed configuration SC to the deployed configuration DC by:
(a') concurrently pivoting the first wing element 240H about the first module pivot axis MPA1 to a first partial first module angular displacement $\theta_{M1}'$, and the second wing element 240V about the second module pivot axis MPA2 to a first partial second module angular displacement $\theta_{M2}'$;
(b') subsequent to step (a'), pivoting said first wing element 240H about the first wing element pivot axis $WPA_H$ by said non-zero first wing element angular displacement $\theta_H$, while concurrently pivoting the first wing element 240H about the first module pivot axis MPA1 to a second partial first module angular displacement $\theta_{M1}''$, and the second wing element 240V about the second module pivot axis MPA2 to a second partial second module angular displacement $\theta_{M2}''$;
(c') subsequent to step (b'), concurrently pivoting the first wing element 240H about the first module pivot axis MPA1 to said first module angular displacement $\theta_{M1}$, and the second wing element 240V about the second module pivot axis MPA1 to said second module angular displacement $\theta_{M2}$;

In such cases:
the second partial first module angular displacement $\theta_{M1}''$ is less than said non-zero first module angular displacement $\theta_{M1}$ and greater than said first partial first module angular displacement $\theta_{M1}'$, and
the second partial second module angular displacement $\theta_{M2}''$ is less than said non-zero second module angular displacement $\theta_{M2}$ and greater than said second partial second module angular displacement $\theta_{M2}'$.

Furthermore, in the method 2000, for examples in which second wing element angular displacement is non-zero, the wing system 200 is configured for deploying each wing deployment module 220 from the stowed configuration SC to the deployed configuration DC by including in step (b'):
(d') pivoting said second wing element 240V about the second wing element pivot axis $WPA_V$ by said non-zero second wing element angular displacement $\theta_V$.

Thus, this method 2000 can be considered to be characterized in that, for each module 220, the respective first wing element 240H and the respective second wing element 240V are for at least a part of the deployment process between the stowed configuration SC to the deployed configuration DC, are concurrently deployed.

Referring in particular to FIG. 10(a), in step 2100 the respective first wing element 240H and the respective second wing element 240V of each module 220 are in the stowed configuration SC, in the aforementioned overlying relationship.

In the first deployment step 2200, and referring in particular to FIG. 10(b), the respective first wing element 240H and the respective second wing element 240V of each module 220 begin to be concurrently rotated about respective first module pivot axis MPA1 and second module pivot axis MPA2, and are rotated through a first part of the respective first module angular displacement $\theta_{M1}$ and second module angular displacement $\theta_{M2}$, i.e., until a respective first partial first module angular displacement $\theta_{M1}'$ and first partial second module angular displacement $\theta_{M2}'$ is reached. In this example, the first module pivot axis MPA1 and second module pivot axis MPA2 are coaxial, and the first partial first module angular displacement $\theta_{M1}'$ and the first partial second module angular displacement $\theta_{M2}'$ are equal to one another. For example, first partial first module angular displacement $\theta_{M1}'$ and the first partial second module angular displacement $\theta_{M2}'$ are each about 45° for example, or can be any suitable angle between about 0° and about 45° for example, or can be any suitable angle between about 0° and about 55° for example. In step 2200 there is no rotation of the respective module 220 about the respective first wing element pivot axis $WPA_H$ and second wing element pivot axis $WPA_V$.

In the second deployment step 2300, and referring in particular to FIG. 10(c), the respective first wing element 240H and the respective second wing element 240V of each module 220 are rotated about respective first wing element pivot axis $WPA_H$ and second wing element pivot axis $WPA_V$, through respective first wing element angular displacement $\theta_H$ and second wing element angular displacement $\theta_V$. In this example, the respective first wing element pivot axis $WPA_H$ and second wing element pivot axis $WPA_V$ are nominally parallel. For example, first wing element angular displacement $\theta_H$ is about 90°, while second wing element angular displacement $\theta_V$ is about 15°. The respective first wing element 240H and the respective second wing element 240V of each module 220 can be concurrently rotated about respective first wing element pivot axis $WPA_H$ and second wing element pivot axis $WPA_V$, until the respective second wing element 240V reaches its respective second wing element angular displacement $\theta_V$, and thereafter the respective first wing element 240H continues to pivot about respective first wing element pivot axis $WPA_H$ until it reaches its respective first wing element angular displacement $\theta_H$. Alternatively, the respective first wing element 240H is first rotated about respective first wing element pivot axis $WPA_H$ until the respective first wing element 240H reaches its respective first wing element angular displacement $\theta_H$, and thereafter the respective second wing element 240V is rotated about respective second wing element pivot axis $WPA_V$ to pivot about respective second wing element pivot axis $WPA_V$ until it reaches its respective second wing element angular displacement $\theta_V$. In any case, in this step the respective first wing element 240H and the respective second wing element 240V of each module 220 are rotated rapidly about respective first wing element pivot axis $WPA_H$ and second wing element pivot axis $WPA_V$, through respective first wing element angular displacement $\theta_H$ and second wing element angular displacement $\theta_V$, while the respective first wing element 240H and the respective second wing element 240V of each module 220 continue to be concurrently rotated about respective first module pivot axis MPA1 and second module pivot axis MPA2. At the end of step 2300 the respective first wing element 240H and the respective second wing element 240V of each module 220 are rotated about respective first module pivot axis MPA1 and second module pivot axis MPA2 through a second part of the respective first module angular displacement $\theta_{M1}$ and second module angular displacement $\theta_{M2}$, i.e., until a respective second partial first module angular displacement $\theta_{M1}''$ and second partial second module angular displacement $\theta_{M2}''$ is reached. At this point, after the respective first wing element 240H and the respective second wing element 240V of each module 220 have been fully rotated about respective first wing element pivot axis $WPA_H$ and second wing element pivot axis $WPA_V$, through respective first wing element angular displacement $\theta_H$ and second wing element angular displacement $\theta_V$, the respective first wing element 240H and the respective second wing element 240V of each module 220 are then locked in place in terms of preventing further pivoting about the respective first wing element pivot axis $WPA_H$ and second wing element pivot axis $WPA_V$. For example, the second partial first module angular displacement $\theta_{M1}''$ and the second partial second module angular displacement $\theta_{M2}''$ are equal to one another. For example, second partial first module angular displacement $\theta_{M1}''$ and the second partial second module angular displacement $\theta_{M2}''$ are each about 75° for example, or can be any suitable angle between about 45° and about 75° for example, or can be any suitable angle between about 45° and about 80° for example.

In at least some alternative variations of this example, second wing element angular displacement $\theta_V$ is zero, and thus in respective the second deployment step 2300, while the respective first wing element 240H of each module 220 is rotated about respective first wing element pivot axis $WPA_H$ through respective first wing element angular displacement $\theta_H$, the respective second wing element 240V is not pivoted about the second wing element pivot axis $WPA_V$.

In the third deployment step 2400, and referring in particular to FIG. 10(d), with the respective first wing element 240H and the respective second wing element 240V of each module 220 locked in terms of preventing further pivoting about the respective first wing element pivot axis $WPA_H$ and second wing element pivot axis $WPA_V$, the respective first wing element 240H and the respective second wing element 240V of each module 220 continue to be concurrently rotated about respective first module pivot axis MPA1 and second module pivot axis MPA2. At the end of step 3400 the respective first wing element 240H and the respective second wing element 240V of each module 220 are now fully rotated about respective first module pivot axis MPA1 and second module pivot axis MPA2 through the full first module angular displacement $\theta_{M1}$ and second module angular displacement $\theta_{M2}$. For example, the first module angular displacement $\theta_{M1}$ and the second module angular displacement $\theta_{M2}$ are each about 90°, or can be any suitable angle between about 75° and about 90°. In other examples, for example where it is desired to provide a non-zero incidence angle for the first wing element 240H in the deployed configuration DC, the first module angular displacement $\theta_{M1}$ and the second module angular displacement OW can be greater than about 90°.

Figure 10E:
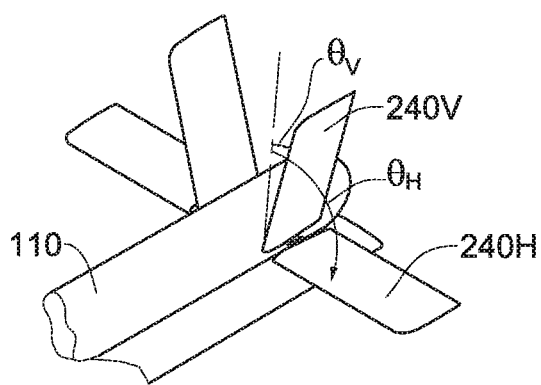

In the final deployment step 2500, and referring in particular to FIG. 10(e), once the respective first wing element 240H and the respective second wing element 240V of each module 220 reach their respective the first module angular displacement $\theta_{M1}$ and the second module angular displacement $\theta_{M2}$, the respective first wing element 240H and the respective second wing element 240V of each module 220 are then locked in place in terms of preventing further pivoting about the respective first module pivot axis MPA1 and second module pivot axis MPA2, to provide the deployed configuration DC.

Without being bound by theory, inventors consider that method 2000 can provide a faster deployment time, for example as compared with method 1000, or, that method 2000 can provide a reduction of acceleration, for example as compared with the deployment time in method 1000.

Without being bound by theory, inventors consider that method 2000 can make use of aerodynamic loads on the wing system 200 during deployment, such as to alleviate deployment actuation requirements.

For example, and again without being bound by theory, inventors consider that a positive deployment moment is to be expected along most of first deployment step 2200, second deployment step 2300, and third deployment step 2400, at all relevant angle of attack conditions, alleviating actuation requirements for rotating the respective first wing element 240H and the respective second wing element 240V of each module 220 about respective first module pivot axis MPA1 and second module pivot axis MPA2. However, and again without being bound by theory, inventors consider that an initial small negative deployment moment could exist at the beginning of the first deployment step 1200, particular at negative angles of attack.

For example, and again without being bound by theory, inventors consider that initiating rotation of the respective first wing element 240H and the respective second wing element 240V of each module 220 about respective first wing element pivot axis $WPA_H$ and second wing element pivot axis $WPA_V$, after partial pivoting of the first wing element 240H and the respective second wing element 240V of each module 220 about respective first module pivot axis MPA1 and second module pivot axis MPA2 about the first partial first module angular displacement $\theta_{M1}'$ and the first partial second module angular displacement $\theta_{M2}'$ (for example of 45°), can help prevent excessive aerodynamic loads on the respective first module pivot axis MPA1 and second module pivot axis MPA2, due to a reduced normal velocity component.

Furthermore, and again without being bound by theory, inventors consider that terminating rotation of the respective first wing element 240H and the respective second wing element 240V of each module 220 about respective first wing element pivot axis $WPA_H$ and second wing element pivot axis $WPA_V$, before full pivoting of the first wing element 240H and the respective second wing element 240V of each module 220 about respective first module pivot axis MPA1 and second module pivot axis MPA2, i.e., at the second partial first module angular displacement $\theta_{M1}''$ and the second partial second module angular displacement $\theta_{M2}''$ (for example of 75°), can help guarantee a positive deployment moment throughout the rotations about the respective first wing element pivot axis $WPA_H$ and second wing element pivot axis $WPA_V$, alleviating actuator requirements.

By having, in the stowed configuration SC, the wing tip 244H and the wing tip 244V of the overlying the first wing element 240H and the second wing element 240V, respectively, facing in the forward direction with respect to the aft fuselage section 110, and the wing root 242H and the wing root 242V facing in the aft direction with respect to the aft fuselage section 110, it is possible to maximize the moment arm of first wing element 240H and the second wing element 240V for providing control moments in pitch, yaw and roll in the deployed configuration DC. Furthermore this arrangement in which the respective wing root 242H and the wing root 242V are aft of the respective wing tip 244H and the wing tip 244V, allows the aerodynamic loads acting on the each of the wing elements 240H, 240V will be in the direction of deployment.

Without being bound to theory, inventors consider that the wing system 200 in the deployed configuration DC allows for rapid stabilization, as well as uncoupled all-axis control for the air vehicle 100, even prior to deployment of the wing arrangement 300 for the generation of aerodynamic lift. The two-wing element structure of the wing deployment modules 220, to provide separate vertical stabilizer and horizontal stabilizers, provides uncoupled, all-axes control capability. In other words, the wing system 200 in the deployed configuration DC allows for steering of the air vehicle 100 even before the wing arrangement 300 is deployed.

Thus, according to an aspect of the presently disclosed subject matter there is provided a method for providing stability and control for an air vehicle, comprising:
  deploying each wing deployment module 220 from the stowed configuration SC to the deployed configuration DC; and
  operating the first wing element 240H and the second wing element 240V of each wing deployment module 220 to provide control moments to the air vehicle 100.

Figure 7A:
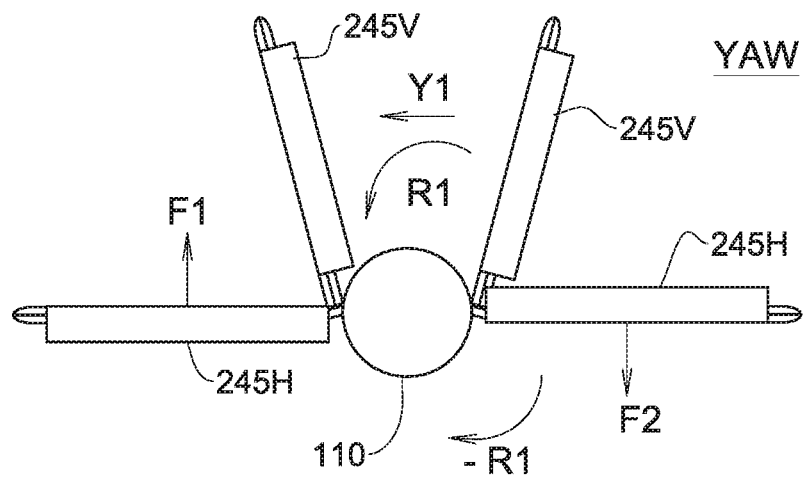
FIG. 7(a) is an aft view of the example of FIG. 1 showing the wing system operating in yaw.

For example, and referring to FIG. 7(a), uncoupled yaw control can be provided by actuating the rudders 245V to pivot in the same, desired, direction, which results in a desired yaw moment Y1 and in an undesired roll moment R1. Concurrent with actuation of the rudders 245V, the elevators 245H are actuated to pivot in opposite directions to generate forces F1, F2 in opposite directions to thereby provide a roll −R1 that is opposite in direction and equal in magnitude to the undesired roll moment R1 that is generated by the deflection of the rudders 245V. This results in zero roll moment, allowing the air vehicle to be subjected to the uncoupled yaw moment Y1.

Figure 7B:
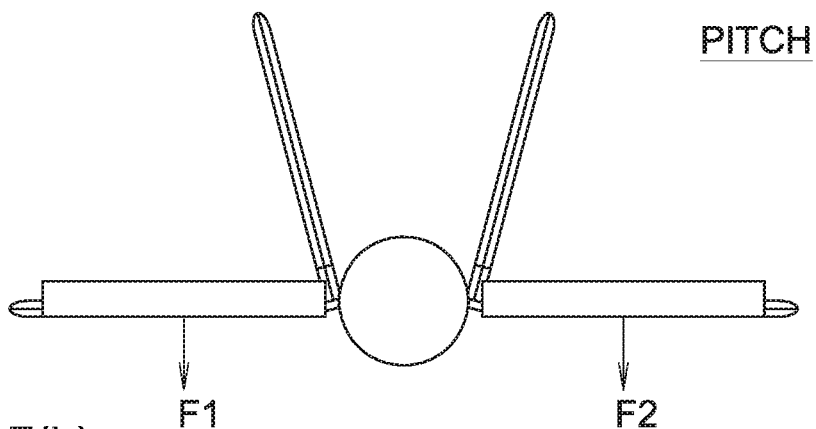
FIG. 7(b) is an aft view of the example of FIG. 7(a) operating in pitch.

For example, and referring to FIG. 7(b), uncoupled pitch control can be provided by actuating the elevators 245H to pivot in the same direction to generate forces F1, F2 in the same direction.

Figure 7C:
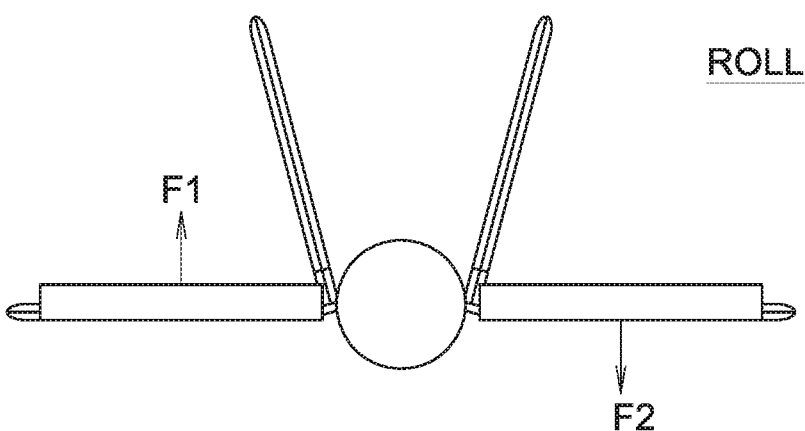
FIG. 7(c) is an aft view of the example of FIG. 7(a) operating in roll.

For example, and referring to FIG. 7(c), uncoupled roll control can be provided by actuating the elevators 245H to pivot in opposite directions to generate forces F1, F2 in opposite directions.

Figure 12A:
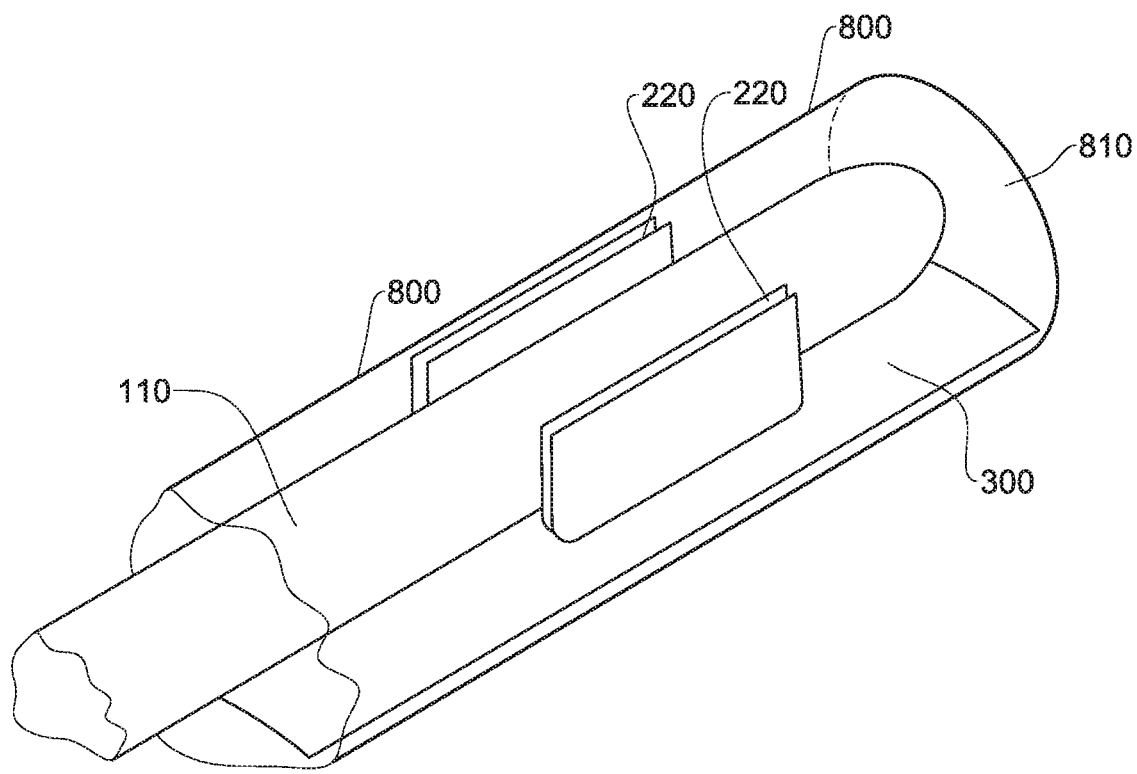
FIG. 12(a) shows in isometric partial view, the air vehicle and wing system of the example of FIG. 1, in stowed configuration accommodated in a fairing.
Figure 12B:
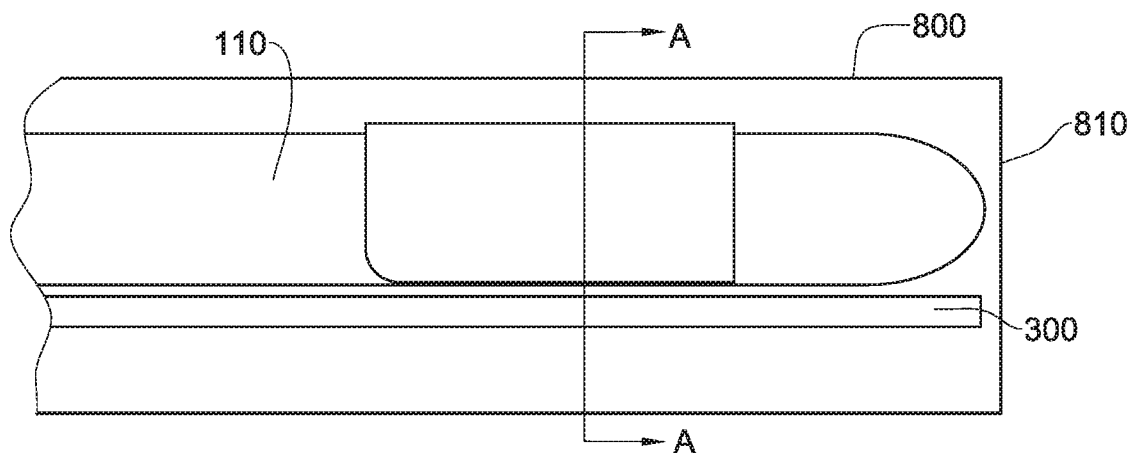
FIG. 12 (b) shows in side view the example of FIG. 12(a)
FIG. 12(c) shows in transverse cross-sectional view the example of FIG. 12(b), taken along A-A.
FIG. 12(d) shows in transverse cross sectional view the example of FIG. 12(b) with the deployable wing arrangement in deployed wing configuration.
Figure 12C:
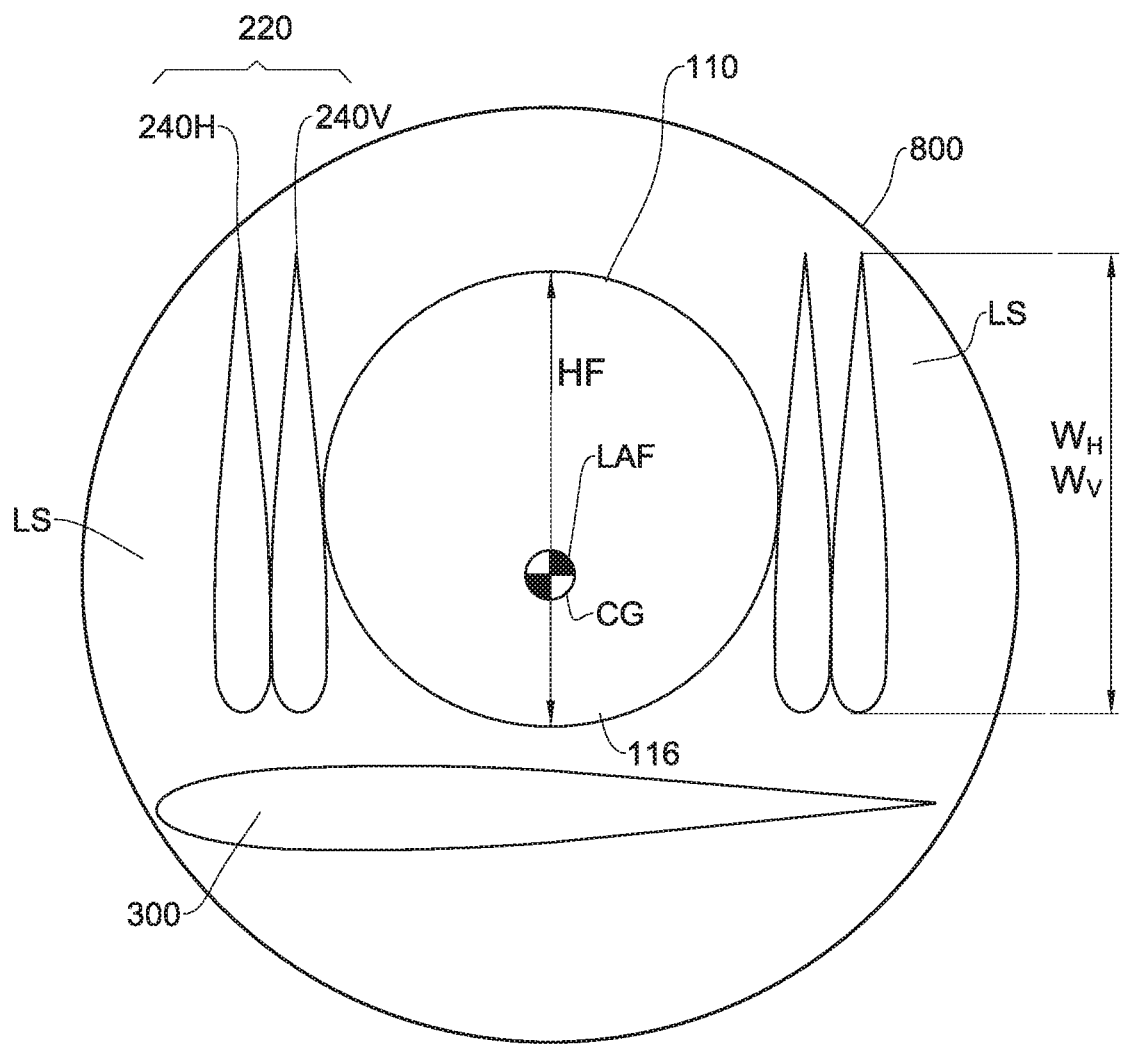

Referring also to FIG. 12(a), FIG. 12(b), and FIG. 12(c), the wing arrangement 300 can include, at least in this example, a foldable or otherwise deployable wing arrangement, including one, two or more aerodynamic lift generating wings, which are deployable from a stowed wing configuration to a deployed wing configuration. In the stowed wing configuration, the one or more aerodynamic lift generating wings are accommodated above and/or below the fuselage, with the respective span axes generally aligned with the aft fuselage section 110. In the deployed wing configuration, the one or more aerodynamic lift generating wings are projecting outwardly with respect to the aft fuselage section such that the leading edge of the wings are now facing an airstream AS, and enable the wings to generate aerodynamic lift. Such an airstream relative to the wings can be a result of the air vehicle 100 travelling at a significant forward speed in air, for example. The one or more aerodynamic lift generating wing are configured for generating sufficient aerodynamic lift for aerodynamic flight for the air vehicle.

The fairing 800 has an internal profile and fairing cross-sectional areas at transverse planes orthogonal to the longitudinal axis LAF of the fairing such as to enable the respective transverse cross-sections of the air vehicle 100 (i.e., the respective external profiles and transverse cross-sectional areas of the air vehicle 100) to be accommodated therein. In at least this example, fairing 800 has a substantially uniform internal profile and a substantially uniform cross-sectional area at transverse planes orthogonal to the longitudinal axis LAF for at least cross-sections of the air vehicle which include the wings 220 in the stowed configuration SC. The longitudinal axis LAF of the fairing is generally defined at the centerline of the fairing.

It is to be noted that at least for some implementations of this example in which the acceleration of the air vehicle 100 (while accommodated in the fairing 800 in a respective assembly) is achieved by applying a force to the assembly (for example a thrust force via a booster rocket, or as a result of being fired from a launch barrel), there can be advantages in having such a force aligned with the fairing longitudinal axis LAF, in particular the centerline of the fairing. In at least such cases there can also be corresponding advantages in having the center of gravity CG of the air vehicle 100 also lying on the fairing longitudinal axis LAF, in particular on the centerline of the fairing. For example, such an arrangement can minimize or eliminate risk of nutation.

In at least some such cases, the air vehicle 100 can be configured such that the chord and size of the wing arrangement 300 is maximized, while the wing arrangement is located either at the bottom of the fuselage (as in the illustrated example) or above the fuselage, in particular the fuselage section 110.

Thus, in at least the example of FIG. 12(a), FIG. 12(b), and FIG. 12(c), the wing arrangement 300 is below the aft fuselage section 110, that is, the wing arrangement 300 is facing a lower portion 116 of the aft fuselage section 110. However, in at least one alternative variation of the example of FIG. 1, the wing arrangement 300 can be above the fuselage, that is, the wing arrangement 300 is facing an upper portion of the fuselage, for example of the aft fuselage section 110.

To maximize potential usage of the faring internal volume for the wing arrangement 300, and according to an aspect of the presently disclosed subject matter, the wing system 200 provides modules 220, in which the respective first wing element 240H and the second wing element 240V are in the aforesaid overlying relationship, and in which the respective chords $C_H$ and $C_V$, and in particular in which the respective widths $W_H$ and $W_V$, allow to maximize utilization of the lateral spaces LS between the aft fuselage section 110 and the internal wall of the fairing 800, without projecting downwards (or in other example, upwards) past where the wing arrangement 300 is to be accommodated. For example, the respective chords $C_H$ and $C_V$, and in particular the respective widths $W_H$ and $W_V$, can be maximized to fit within the lateral spaces LS while not extending beyond the cross-section of the fuselage aft section 110. This feature enables the wing system 200 to be used with a variety of different types of wing arrangements 300, and allows for the span of the wing arrangements to be maximized to extend to the aft end 810 of the fairing 800. For example, for each wing module 220, the respective first wing element 240H and the second wing element 240V have respective chords $C_H$ and $C_V$, and in particular have respective widths $W_H$ and $W_V$, about the height HF of the aft fuselage section 110.

According to this aspect of the presently disclosed subject matter, great flexibility can be exercised in the design of the wing modules 220 of the wing system 200. For example, the respective first wing element 240H and the second wing element 240V can be designed with relatively large spans $S_H$ and $S_V$, since they can be accommodated along the correspondingly long sides of the fuselage aft section 110. Furthermore, for example, the respective first wing element 240H and the second wing element 240V can be designed with similar spans $S_H$ and $S_V$, or with unequal spans $S_H$ and $S_V$, which can facilitate further maximization of the available volume in the lateral spaces LS. Furthermore, for example, the respective first wing element 240H and the second wing element 240V can be designed with similar chords $C_H$ and $C_V$, and in particular having similar widths $W_H$ and $W_V$, or with unequal chords $C_H$ and $C_V$, and in particular having non-similar widths $W_H$ and $W_V$ which can facilitate further maximization of the available volume in the lateral spaces LS. Furthermore, for example, the respective first wing element 240H and the second wing element 240V can be designed with tapered planforms, which can facilitate further maximization of the available volume in the lateral spaces LS. For example, the respective first wing element 240H and the second wing element 240V can be designed with desired spans $S_H$ and $S_V$, and desired chords $C_H$ and $C_V$, and in particular having corresponding widths $W_H$ and $W_V$, such as to provide desired mechanical and aerodynamic performance in the deployed configuration DC, while enabling compact storage in the stowed configuration SC.

It is to be noted that while in at least this example, the wing system 200 is configured as an empennage for the air vehicle 100, in other alternative variations of this example, the wing system, or at least a part of the wing system, according to another aspect of the presently disclosed subject matter, can be configured as the main aerodynamic lift generating wings for the air vehicle 100.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the scope of the presently disclosed subject matter as set out in the claims

The invention claimed is:

1. A wing system for an air vehicle, the air vehicle having a fuselage including a fuselage section and a fuselage longitudinal axis, the wing system comprising at least one wing deployment module, each wing deployment module comprising:
   a set of wing elements, including at least a first said wing element having a first wing element longitudinal axis, and a second said wing element having a second wing element longitudinal axis;
   each said wing deployment module configured for selectively transitioning between a respective stowed configuration and a respective deployed configuration;
   wherein in the stowed configuration, the first wing element and the second wing element are in overlying relationship such that the first wing element longitudinal axis and the second wing element longitudinal axis are nominally parallel with one another; and
   wherein in the deployed configuration, the first wing element is oriented with respect to the second wing element such that the first wing element longitudinal axis is non-parallel with respect to the second wing element longitudinal axis
   and wherein for each said wing deployment module:
      each said first wing element is configured for being transitioned between the stowed configuration and the deployed configuration by:
         pivoting said first wing element about a first module pivot axis by a non-zero first module angular displacement, and
         pivoting said first wing element about a first wing element pivot axis by a non-zero first wing element angular displacement;
      and
      each said second wing element is configured for being transitioned between the stowed configuration and the deployed configuration by:
   pivoting said second wing element about a second module pivot axis by a non-zero second module angular displacement.

2. The wing system according to claim 1, wherein for each wing deployment module, each said second wing element is further configured for being transitioned between the stowed configuration and the deployed configuration by:
   pivoting said second wing element about a second wing element pivot axis by a non-zero second wing element angular displacement.

3. A method for operating a wing system, comprising the steps of:
   (A) providing a wing system as defined in claim 2; and
   (B) deploying each said wing deployment module from the stowed configuration to the deployed configuration.

4. The method according to claim 3, wherein step (B) comprises one of step (B1) or step (B2):
   wherein step (B1) comprises:
      pivoting said first wing element about the first module pivot axis by the non-zero first module angular displacement, pivoting said first wing element about the first wing element pivot axis by the non-zero first wing element angular displacement; and pivoting said second wing element about the second module pivot axis by the non-zero second module angular displacement;

wherein step (B2) comprises:

pivoting said first wing element about the first module pivot axis by the non-zero first module angular displacement, pivoting said first wing element about the first wing element pivot axis by the non-zero first wing element angular displacement;

pivoting said second wing element about the second module pivot axis by the non-zero second module angular displacement; and pivoting said second wing element about the second wing element pivot axis by the non-zero second wing element angular displacement.

5. The method according to claim 3, wherein step (B) comprises one of step (B1) or step (B2):

wherein step (B1) comprises:
(a1) concurrently pivoting the first wing element about the first module pivot axis by said non-zero first module angular displacement and the second wing element about the second module pivot axis by said non-zero second module angular displacement; and
(b1) subsequent to step (a1), pivoting said first wing element about the first wing element pivot axis by said non-zero first wing element angular displacement;

wherein step (B2) comprises:
(a2) concurrently pivoting the first wing element about the first module pivot axis by said non-zero first module angular displacement and the second wing element about the second module pivot axis by said non-zero second module angular displacement;
(b2) subsequent to step (a2), pivoting said first wing element about the first wing element pivot axis by said non-zero first wing element angular displacement; and
(c2) subsequent to step (a2), pivoting said second wing element about the second wing element pivot axis by said non-zero second wing element angular displacement.

6. The method according to claim 3, wherein step (B) comprises one of step (B1) or step (B2):

wherein step (B1) comprises:
(a1) concurrently pivoting the first wing element about the first module pivot axis to a first partial first module angular displacement, and the second wing element about the second module pivot axis to a first partial second module angular displacement;
(b1) subsequent to step (a1), pivoting said first wing element about the first wing element pivot axis by said non-zero first wing element angular displacement, while concurrently pivoting the first wing element about the first module pivot axis to a second partial first module angular displacement, and the second wing element about the second module pivot axis to a second partial second module angular displacement; and
(c1) subsequent to step (b1), concurrently pivoting the first wing element about the first module pivot axis to said first module angular displacement, and the second wing element about the second module pivot axis to said second module angular displacement;

wherein said second partial first module angular displacement is less than said non-zero first module angular displacement and greater than said first partial first module angular displacement, and wherein said second partial second module angular displacement is less than said non-zero second module angular displacement and greater than said first partial second module angular displacement;

wherein step (B2) comprises:
(a2) concurrently pivoting the first wing element about the first module pivot axis to a first partial first module angular displacement, and the second wing element about the second module pivot axis to a first partial second module angular displacement;
(b2) subsequent to step (a2), pivoting said first wing element about the first wing element pivot axis by said non-zero first wing element angular displacement, while concurrently pivoting the first wing element about the first module pivot axis to a second partial first module angular displacement, and the second wing element about the second module pivot axis to a second partial second module angular displacement; and
(c2) subsequent to step (b2), concurrently pivoting the first wing element about the first module pivot axis to said first module angular displacement, and the second wing element about the second module pivot axis to said second module angular displacement;

wherein said second partial first module angular displacement is less than said non-zero first module angular displacement and greater than said first partial first module angular displacement, and wherein said second partial second module angular displacement is less than said non-zero second module angular displacement and greater than said first partial second module angular displacement;

and further including in step (b2):
(d2) pivoting said second wing element about the second wing element pivot axis by said non-zero second wing element angular displacement.

7. The method according to claim 3, wherein step (B) comprises one of step (B1) or step (B2):

wherein step (B1) comprises:
(a1) pivoting the first wing element about the first module pivot axis to a first partial first module angular displacement;
(b1) subsequent to step (a1), pivoting said first wing element about the first wing element pivot axis by said non-zero first wing element angular displacement, and pivoting the first wing element about the first module pivot axis to a second partial first module angular displacement; and
(c1) subsequent to step (b1), pivoting the first wing element about the first module pivot axis to said first module angular displacement;

wherein said second partial first module angular displacement is less than said non-zero first module angular displacement and greater than said first partial first module angular displacement;

wherein step (B2) comprises:
(a2) pivoting the first wing element about the first module pivot axis to a first partial first module angular displacement;
(b2) subsequent to step (a2), pivoting said first wing element about the first wing element pivot axis by said non-zero first wing element angular displacement, and pivoting the first wing element about the first module pivot axis to a second partial first module angular displacement; and (c2) subsequent to step (b2), pivoting the first wing element about the first module pivot axis to said first module angular displacement;

wherein said second partial first module angular displacement is less than said non-zero first module angular displacement and greater than said first partial first module angular displacement;

and further including in step (b2):

(d2) pivoting said second wing element about the second wing element pivot axis by said non-zero second wing element angular displacement.

8. The method according to claim 3, wherein step (B) comprises one of step (B1) or step (B2):

wherein step (B1) comprises:

(a1) pivoting the second wing element about the second module pivot axis to a first partial second module angular displacement;

(b1) subsequent to step (a1), pivoting the second wing element about the second module pivot axis to a second partial second module angular displacement; and (c1) subsequent to step (b1), pivoting the second wing element about the second module pivot axis to said second module angular displacement;

wherein said second partial second module angular displacement is less than said non-zero second module angular displacement and greater than said first partial second module angular displacement;

wherein step (B2) comprises:

(a2) pivoting the second wing element about the second module pivot axis to a first partial second module angular displacement;

(b2) subsequent to step (a2), pivoting the second wing element about the second module pivot axis to a second partial second module angular displacement; and (c2) subsequent to step (b2), pivoting the second wing element about the second module pivot axis to said second module angular displacement;

wherein said second partial second module angular displacement is less than said non-zero second module angular displacement and greater than said first partial second module angular displacement;

and further including in step (b2):

(d2) pivoting said second wing element about the second wing element pivot axis by said non-zero second wing element angular displacement.

9. The wing system according to claim 1, including one of the following:

wherein in the stowed configuration, the first wing element and the second wing element are configured in said overlying relationship for being oriented with respect to the fuselage section such that the first wing element longitudinal axis and the second wing element longitudinal axis are each nominally parallel with the fuselage longitudinal axis;

wherein in the stowed configuration, the first wing element and the second wing element are configured in said overlying relationship for being oriented with respect to the fuselage section such that the first wing element longitudinal axis and the second wing element longitudinal axis are each nominally parallel with the fuselage longitudinal axis, and, wherein in the deployed configuration, the first wing element is oriented with respect to the fuselage section such that the first wing element longitudinal axis is non-parallel with respect to the fuselage longitudinal axis; or wherein in the stowed configuration, the first wing element and the second wing element are configured in said overlying relationship for being oriented with respect to the fuselage section such that the first wing element longitudinal axis and the second wing element longitudinal axis are each nominally parallel with the fuselage longitudinal axis, and, wherein in the deployed configuration, the second wing element is oriented with respect to the fuselage section such that the second wing element longitudinal axis is non-parallel with respect to the fuselage longitudinal axis.

10. The wing system according to claim 1, wherein in the deployed configuration, the first wing element longitudinal axis is configured to be nominally parallel with the pitch axis of the air vehicle.

11. The wing system according to claim 1, including one of the following:

wherein each wing deployment module in the stowed configuration comprises a first wing root of the first wing element in overlying relationship with respect to a second wing root of the second wing element; or wherein each wing deployment module in the stowed configuration comprises a first wing root of the first wing element in overlying relationship with respect to a second wing root of the second wing element, and, wherein each wing deployment module comprises a first wing tip of the first wing element, and a second wing tip of the second wing element, and wherein each wing deployment module is configured such that in the stowed configuration the first wing tip is forward of the first wing root, and/or the second wing tip is forward of the second wing root, with respect to the air vehicle.

12. The wing system according to claim 1, including at least one of the following:

wherein at least one of said first module pivot axis and said second module pivot axis is parallel to a pitch axis of the air vehicle; or wherein at least one of said first wing element pivot axis and said second wing element pivot axis is parallel to a roll axis of the air vehicle.

13. The wing system according to claim 1, wherein said first module pivot axis and said second module pivot axis are co-axial.

14. The wing system according to claim 1, wherein said wing deployment module is configured for pivoting as a unit about at least one of said first module pivot axis and said second module pivot axis.

15. The wing system according to claim 1, configured for deploying the wing deployment module from the stowed configuration to the deployed configuration by:

(a) concurrently pivoting the first wing element about the first module pivot axis by said non-zero first module angular displacement and the second wing element about the second module pivot axis by said non-zero second module angular displacement; and (b) subsequent to step (a), pivoting said first wing element about the first wing element pivot axis by said non-zero first wing element angular displacement.

16. The wing system according to claim 15, configured for deploying the wing deployment module from the stowed configuration to the deployed configuration by:

(c) subsequent to step (a), pivoting said second wing element about the second wing element pivot axis by said non-zero second wing element angular displacement.

17. The wing system according to claim 1, configured for deploying the wing deployment module from the stowed configuration to the deployed configuration by:
- (a) concurrently pivoting the first wing element about the first module pivot axis to a first partial first module angular displacement, and the second wing element about the second module pivot axis to a first partial second module angular displacement;
- (b) subsequent to step (a), pivoting said first wing element about the first wing element pivot axis by said non-zero first wing element angular displacement, while concurrently pivoting the first wing element about the first module pivot axis to a second partial first module angular displacement, and the second wing element about the second module pivot axis to a second partial second module angular displacement; and
- (c) subsequent to step (b), concurrently pivoting the first wing element about the first module pivot axis to said first module angular displacement, and the second wing element about the second module pivot axis to said second module angular displacement;
- wherein said second partial first module angular displacement is less than said non-zero first module angular displacement and greater than said first partial first module angular displacement, and
- wherein said second partial second module angular displacement is less than said non-zero second module angular displacement and greater than said first partial second module angular displacement.

18. The wing system according to claim 17, configured for deploying the wing deployment module from the stowed configuration to the deployed configuration by further including in step (b):
- (d) pivoting said second wing element about the second wing element pivot axis by said non-zero second wing element angular displacement.

19. The wing system according to claim 1, configured for deploying the wing deployment module from the stowed configuration to the deployed configuration by:
- (a1) pivoting the first wing element about the first module pivot axis to a first partial first module angular displacement;
- (b1) subsequent to step (a1), pivoting said first wing element about the first wing element pivot axis by said non-zero first wing element angular displacement, and pivoting the first wing element about the first module pivot axis to a second partial first module angular displacement; and
- (c1) subsequent to step (b1), respectively pivoting the first wing element about the first module pivot axis to said first module angular displacement;
- wherein said second partial first module angular displacement is less than said non-zero first module angular displacement and greater than said first partial first module angular displacement.

20. The wing system according to claim 19, configured for deploying the wing deployment module from the stowed configuration to the deployed configuration by further including in step (b1):
- (d1) pivoting said second wing element about the second wing element pivot axis by said non-zero second wing element angular displacement.

21. The wing system according to claim 1, configured for deploying the wing deployment module from the stowed configuration to the deployed configuration by:
- (a2) pivoting the second wing element about the second module pivot axis to a first partial second module angular displacement;
- (b2) subsequent to step (a2), pivoting the second wing element about the second module pivot axis to a second partial second module angular displacement; and
- (c2) subsequent to step (b2), pivoting the second wing element about the second module pivot axis to said second module angular displacement;
- wherein said second partial second module angular displacement is less than said non-zero second module angular displacement and greater than said first partial second module angular displacement.

22. The wing system according to claim 21, configured for deploying the wing deployment module from the stowed configuration to the deployed configuration by further including in step (b2):
- (d2) pivoting said second wing element about the second wing element pivot axis by said non-zero second wing element angular displacement.

23. The wing system according to claim 1,
- wherein each said wing deployment module is configured for being mounted to a lateral side of the fuselage section.

24. An air vehicle comprising a wing system as defined in claim 1, the air vehicle having a fuselage including a fuselage section and a fuselage longitudinal axis.

25. The air vehicle according to claim 24, including one of the following:
- the air vehicle further comprising a deployable wing arrangement, including at least one aerodynamic lift generating wing, deployable from a stowed wing configuration to a deployed wing configuration, the deployable wing arrangement being mounted in one of above and below with respect to the fuselage section, wherein said at least one aerodynamic lift generating wing is configured for generating aerodynamic lift for aerodynamic flight for the air vehicle;
- the air vehicle further comprising a deployable wing arrangement, including at least one aerodynamic lift generating wing, deployable from a stowed wing configuration to a deployed wing configuration, the deployable wing arrangement being mounted in one of above and below with respect to the fuselage section, wherein said at least one aerodynamic lift generating wing is configured for generating aerodynamic lift for aerodynamic flight for the air vehicle, and, wherein the deployable wing arrangement is mounted below with respect to the fuselage section, and wherein in the stowed configuration the first wing element and the second wing element of each wing deployment module are configured such as to avoid projecting in a downwardly direction past the wing arrangement;
- the air vehicle further comprising a deployable wing arrangement, including at least one aerodynamic lift generating wing, deployable from a stowed wing configuration to a deployed wing configuration, the deployable wing arrangement being mounted in one of above and below with respect to the fuselage section, wherein said at least one aerodynamic lift generating wing is configured for generating aerodynamic lift for aerodynamic flight for the air vehicle, and, wherein the air vehicle is configured for being accommodated in a fairing when the wing system is in the stowed configuration; or
- the air vehicle further comprising a deployable wing arrangement, including at least one aerodynamic lift generating wing, deployable from a stowed wing configuration to a deployed wing configuration, the deployable wing arrangement being mounted in one of above and below with respect to the fuselage section, wherein said at least one aerodynamic lift generating wing is configured for generating aerodynamic lift for aerodynamic flight for the air vehicle, and, wherein the deployable wing arrangement is mounted below with respect to the fuselage section, and wherein in the stowed configuration the first wing element and the second wing element of each wing deployment module are configured such as to avoid projecting in a downwardly direction past the wing arrangement, and, wherein the air vehicle is configured for being accommodated in a fairing when the wing system is in the stowed configuration.

26. The wing system according to claim 1:
wherein each said wing deployment module is configured for being mounted to a lateral side of the fuselage section, and, wherein each said wing deployment module is configured with a respective maximum width in the stowed configuration correlated with a fuselage height of the fuselage section.

27. A wing system for an air vehicle, the air vehicle having a fuselage including a fuselage section and a fuselage longitudinal axis, the wing system comprising at least one wing deployment module, each wing deployment module comprising:
a set of wing elements, including at least a first said wing element having a first wing element longitudinal axis, and a second said wing element having a second wing element longitudinal axis;
each said wing deployment module configured for selectively transitioning between a respective stowed configuration and a respective deployed configuration;
wherein in the stowed configuration, the first wing element and the second wing element are in overlying relationship such that the first wing element longitudinal axis and the second wing element longitudinal axis are nominally parallel with one another; and
wherein in the deployed configuration, the first wing element is oriented with respect to the second wing element such that the first wing element longitudinal axis is non-parallel with respect to the second wing element longitudinal axis
and wherein for each said wing deployment module:
each said first wing element is configured for being transitioned between the stowed configuration and the deployed configuration by:
pivoting said first wing element about a first module pivot axis by a non-zero first module angular displacement, and
pivoting said first wing element about a first wing element pivot axis by a non-zero first wing element angular displacement;
and
each said second wing element is configured for being transitioned between the stowed configuration and the deployed configuration by:
pivoting said second wing element about a second module pivot axis by a non-zero second module angular displacement;
the wing system including a first said wing deployment module configured for being mounted to the air vehicle at a port side of the fuselage section, and a second said wing deployment module configured for being mounted to the air vehicle at a starboard side of the fuselage section.

28. A wing system for an air vehicle, the air vehicle having a fuselage including a fuselage section and a fuselage longitudinal axis, the wing system comprising at least one wing deployment module, each wing deployment module comprising:
a set of wing elements, including at least a first said wing element having a first wing element longitudinal axis, and a second said wing element having a second wing element longitudinal axis;
each said wing deployment module configured for selectively transitioning between a respective stowed configuration and a respective deployed configuration;
wherein in the stowed configuration, the first wing element and the second wing element are in overlying relationship such that the first wing element longitudinal axis and the second wing element longitudinal axis are nominally parallel with one another; and
wherein in the deployed configuration, the first wing element is oriented with respect to the second wing element such that the first wing element longitudinal axis is non-parallel with respect to the second wing element longitudinal axis
and wherein for each said wing deployment module:
each said first wing element is configured for being transitioned between the stowed configuration and the deployed configuration by:
pivoting said first wing element about a first module pivot axis by a non-zero first module angular displacement, and
pivoting said first wing element about a first wing element pivot axis by a non-zero first wing element angular displacement;
and
each said second wing element is configured for being transitioned between the stowed configuration and the deployed configuration by:
pivoting said second wing element about a second module pivot axis by a non-zero second module angular displacement;
the wing system including one of:
wherein for each said wing deployment module, the first wing element is configured as a horizontal stabilizer, and the second wing element is configured as a vertical stabilizer; or
wherein for each said wing deployment module, the first wing element is configured as a horizontal stabilizer, and the second wing element is configured as a vertical stabilizer, and, wherein for each said wing deployment module, the first wing element comprises an actuable elevator, and the second wing element comprises an actuable rudder.

29. A wing system configured as an empennage for an air vehicle, the air vehicle having a fuselage including a fuselage section and a fuselage longitudinal axis, the wing system comprising:
at least one wing deployment module, each wing deployment module comprising:
a set of wing elements, including at least a first said wing element configured as a horizontal stabilizer and having a first wing element longitudinal axis, and a second said wing element configured as a vertical stabilizer having a second wing element longitudinal axis;
each said wing deployment module configured for selectively transitioning between a respective stowed configuration and a respective deployed configuration;

wherein in the stowed configuration, the first wing element and the second wing element are in overlying relationship such that the first wing element longitudinal axis and the second wing element longitudinal axis are nominally parallel with one another;

wherein in the deployed configuration, the first wing element is oriented with respect to the second wing element such that the first wing element longitudinal axis is non-parallel with respect to the second wing element longitudinal axis;

wherein each said first wing element is configured for being transitioned between the stowed configuration and the deployed configuration by:

pivoting said first wing element about a module pivot axis by a non-zero module angular displacement, and pivoting said first wing element about a first wing element pivot axis by a non-zero first wing element angular displacement;

wherein each said second wing element is configured for being transitioned between the stowed configuration and the deployed configuration by:

pivoting said second wing element about said module pivot axis by said non-zero module angular displacement.

* * * * *